(12) United States Patent
Dixit

(10) Patent No.: US 11,539,204 B1
(45) Date of Patent: Dec. 27, 2022

(54) INTELLIGENT CIRCUIT BREAKER WITH DYNAMIC COORDINATION SYSTEM

(71) Applicant: EATON INTELLIGENT POWER LIMITED, Dublin (IE)

(72) Inventor: Rishabh Dixit, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/462,368

(22) Filed: Aug. 31, 2021

(51) Int. Cl.
  *H02H 7/00* (2006.01)
  *H02H 7/22* (2006.01)
  *H02H 1/00* (2006.01)

(52) U.S. Cl.
  CPC ............ *H02H 7/22* (2013.01); *H02H 1/0007* (2013.01); *H02H 1/0092* (2013.01)

(58) Field of Classification Search
  None
  See application file for complete search history.

(56) References Cited

U.S. PATENT DOCUMENTS

| 10,276,321 | B2 * | 4/2019 | Kennedy | H01H 9/54 |
| 2003/0126253 | A1 * | 7/2003 | Ewing | H02J 13/0005 709/223 |
| 2014/0214218 | A1 * | 7/2014 | Eldridge | H02H 7/22 700/286 |
| 2020/0395739 | A1 * | 12/2020 | Santore | H02B 1/04 |

* cited by examiner

*Primary Examiner* — Stephen W Jackson
(74) *Attorney, Agent, or Firm* — Eckert Seamans Cherin & Mellott, LLC

(57) ABSTRACT

A power distribution system includes a first intelligent circuit breaker; a plurality of second intelligent circuit breakers, the second intelligent circuit breaker is structured to transmit the circuit breaker information to the first intelligent circuit breaker; and an energy monitoring device coupled to the first and second intelligent circuit breakers and structured to receive the circuit breaker information, the energy monitoring device including a dynamic coordination system structured to: (i) determine whether an adjustment to configuration setting of an intelligent circuit breaker is required based at least in part on the circuit breaker information, (ii) identify the intelligent circuit breaker with the configuration setting required to be adjusted based on a determination that the adjustment is required, and (iii) transmit an alert to user, indicating that the adjustment to the configuration setting of the identified intelligent circuit breaker is required and device address of the identified intelligent circuit breaker.

20 Claims, 13 Drawing Sheets

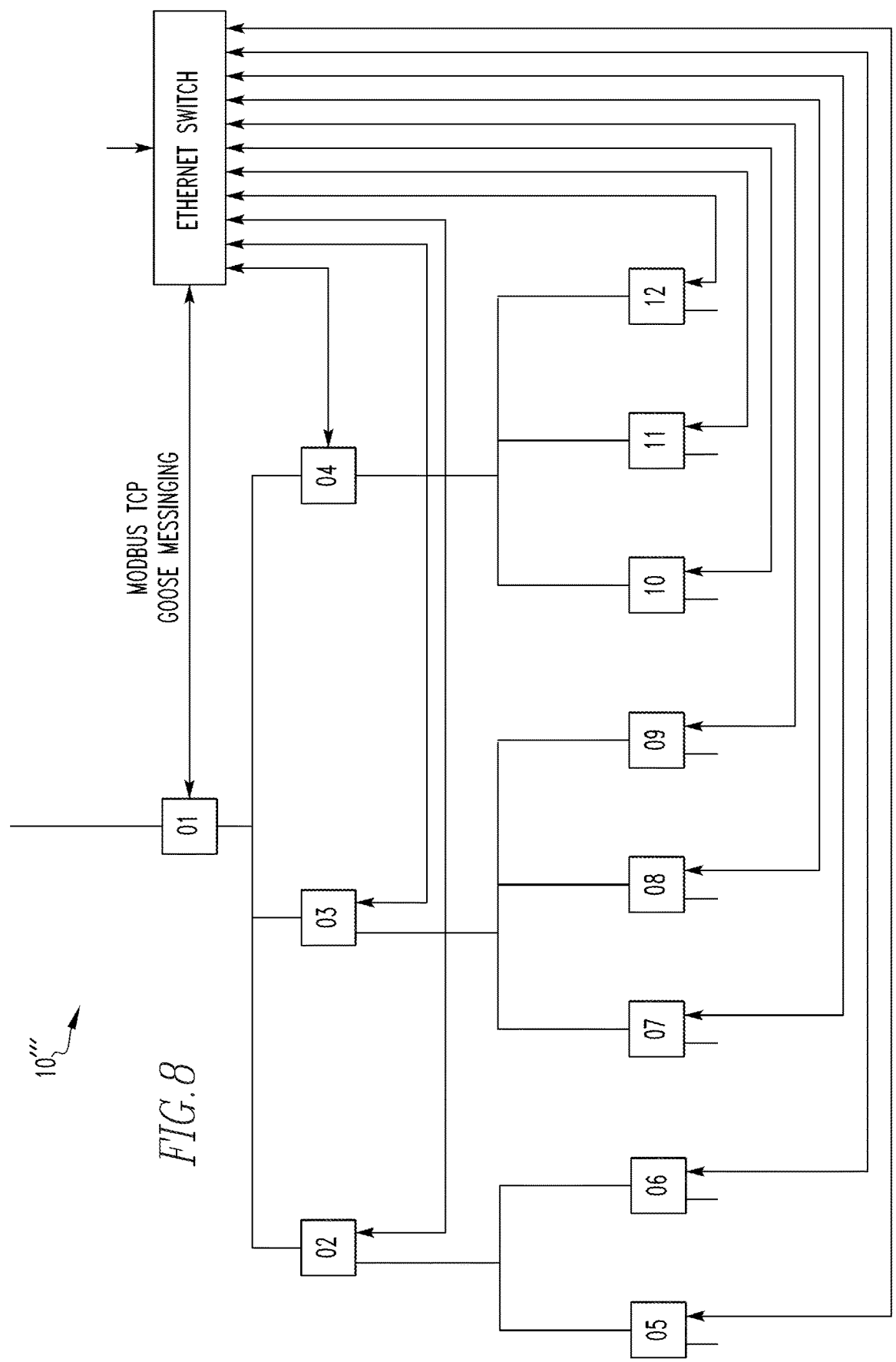

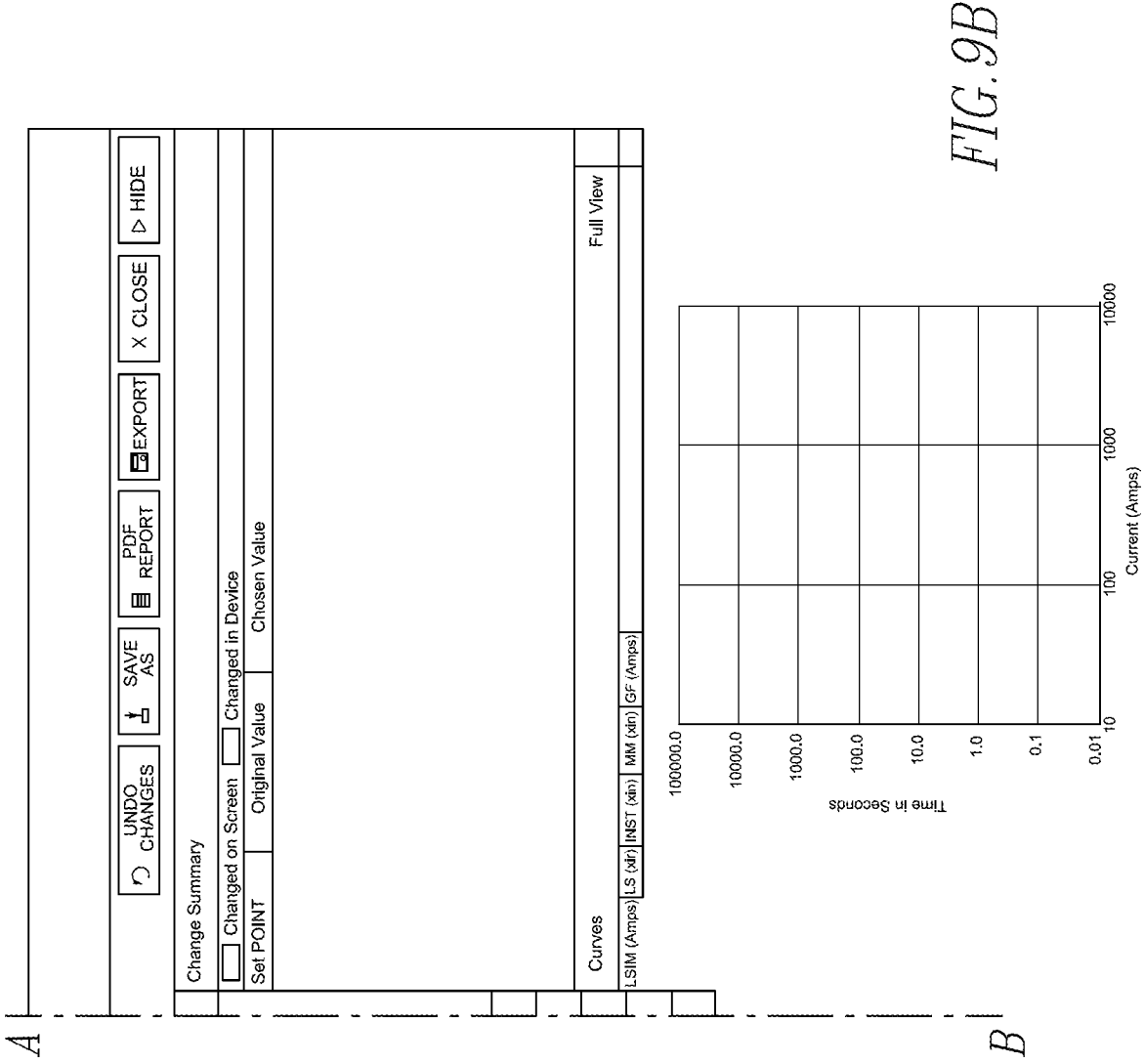

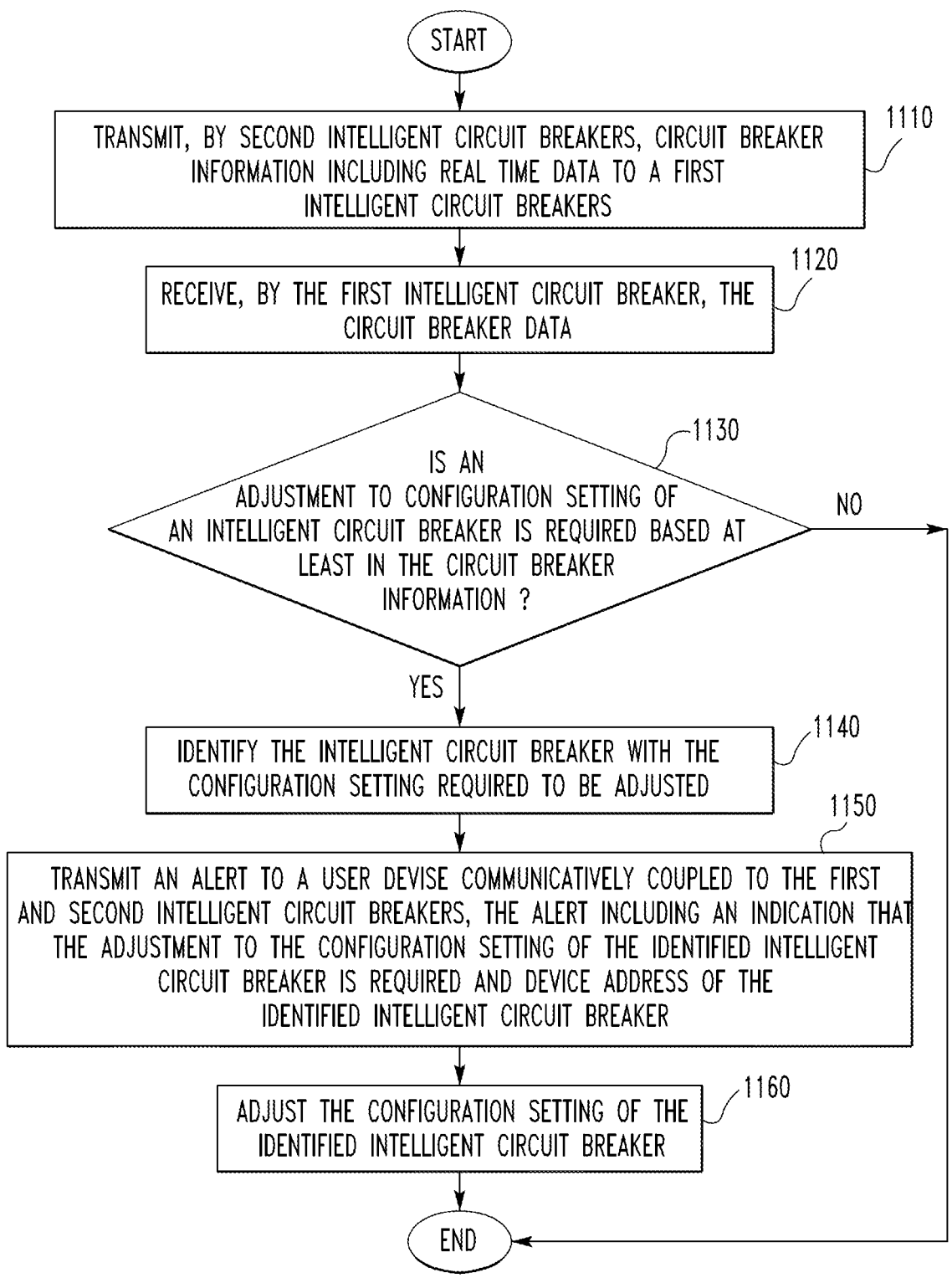

INTELLIGENT CIRCUIT BREAKER WITH DYNAMIC COORDINATION SYSTEM

BACKGROUND OF THE INVENTION

Field of the Invention

The disclosed concept relates generally to circuit breakers for use with a load, and in particular, to intelligent circuit breaker with a dynamic coordination system.

Background Information

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit breaker coordination uses a plurality of circuit breakers in a power distribution system to isolate electrical issues, stop nuisance tripping and avoid system-wide blackouts. Circuit breaker coordination includes coordination and selective coordination. Selective coordination applies for the full range of overcurrent on the system and the full range of overcurrent interrupting times associated with those overcurrents whereas coordination is required for overcurrent protective devices for essential electrical systems in healthcare facilities. The circuit breaker coordination is intended to minimize risk of power loss to life safety systems (e.g., without limitation emergency lighting, fire detection, elevators, etc.), reduce the risk of costly operational loss or downtime for, e.g., without limitation, IT equipment or continuous process manufacturing operations, and provide faster identification and resolution of fault condition on the system by isolating the electrical problem (e.g., tripping the faulty circuit breaker).

However, even with the circuit breaker coordination, nuisance tripping still occurs as a result of a wrong setting configuration (e.g., trip unit setting) of one or more circuit breakers. Upon such power loss, conventional circuit breakers require manual intervention to adjust trip unit setting of the one or more circuit breakers to establish coordination among the circuit breakers. Further, identifying the source of issue (e.g., without limitation, an incorrect trip unit setting, type of fault condition, etc.), location of a fault condition, and a faulty or incorrectly-configured circuit breaker poses a challenge, leading to huge operational losses. Also, the power distribution system may need to be shut down in order to perform manual adjustment of, e.g., the trip unit setting, that led to the operational loss such as lost production, costly downtime, or destruction of inventories. Thus, the conventional circuit breakers lack a pro-active or preemptive correction mechanism of an incorrect circuit breaker configuration setting (e.g., the trip unit setting) and/or an alert capability to alert the user or operator of a current or potential trip event for immediate correction and adjustment of the incorrect circuit breaker setting.

There is room for improvement in coordinating and adjusting configuration setting of circuit breakers in a power distribution system.

SUMMARY OF THE INVENTION

These needs, and others, are met by at least one embodiment of the disclosed concept in which a power distribution system using dynamic coordination includes: a first intelligent circuit breaker comprising a first electronic trip unit including a first communication module; a plurality of second intelligent circuit breakers each comprising a second electronic trip unit including a second communication module, the first intelligent circuit breaker arranged in a first level and the second intelligent circuit breakers arranged in one or more remaining levels, each level comprising at least one upstream circuit breaker coupled to respective downstream circuit breakers, where the second intelligent circuit breaker is structured to transmit circuit breaker information to the first intelligent circuit breaker, and where the first electronic trip unit and the second electronic trip unit include an energy monitoring device monitor and control the operation of the first and second intelligent circuit breakers, the energy monitoring device including a dynamic coordination system structured to: (i) determine whether an adjustment to configuration setting of an intelligent circuit breaker is required based at least in part on the circuit breaker information, (ii) identify the intelligent circuit breaker with the configuration setting required to be adjusted based on a determination that the adjustment is required, and (iii) transmit an alert to user, the alert comprising an indication that the adjustment to the configuration setting of the identified intelligent circuit breaker is required and device address of the identified intelligent circuit breaker, and where the first and second intelligent circuit breakers are communicatively couplable to a user device also including the energy monitoring device comprising the dynamic coordination system.

In accordance with an example embodiment of the disclosed concept, a method for dynamic coordination with a first intelligent circuit breaker in a first level and second intelligent circuit breakers downstream to the first intelligent circuit breaker in one or more remaining levels in a power distribution system, each level including at least one upstream circuit breaker, each upstream circuit breaker coupled to respective downstream circuit breakers, and each intelligent circuit breaker including an energy monitoring device with a dynamic coordination system. The method includes transmitting, by the second intelligent circuit breakers, circuit breaker information comprising real time data to the first intelligent circuit breaker; receiving, by the first intelligent circuit breaker, the circuit breaker information; determining, by a dynamic coordination system of an energy monitoring device, whether an adjustment to configuration setting of an intelligent circuit breaker is required based at least in part on the real time data; identifying the upstream circuit breaker with the configuration setting required to be adjusted based on a determination that the adjustment is required; transmitting an alert to a user device communicatively coupled to the first and second intelligent circuit breakers, the alert comprising an indication that the adjustment to the configuration setting of the identified intelligent circuit breaker is required and device address of the identified intelligent circuit breaker; and adjusting the configuration setting of the identified intelligent circuit breaker.

In accordance with an example embodiment of the disclosed concept, a method for installing a dynamic coordination system in an energy monitoring device in a user device couplable to a first intelligent circuit breaker and a plurality of second intelligent circuit breakers downstream to the first intelligent circuit breaker in a power distribution system is provided. The method includes connecting the first and second intelligent circuit breakers to the energy monitoring device; determining whether the energy monitoring device comprises the dynamic coordination system; creating a dynamic coordination indicator for enabling or disabling the dynamic coordination system on a user interface of the energy monitoring device based on a determination that the energy monitoring device does not comprise the dynamic coordination system; and creating a dynamic coordination configurator on the user interface.

BRIEF DESCRIPTION OF THE DRAWINGS

A full understanding of the invention can be gained from the following description of the preferred embodiments when read in conjunction with the accompanying drawings in which:

FIG. 8 is a schematic diagram of an example power distribution system with a communication module in accordance with an example embodiment of the disclosed concept;

FIGS. 9A-B is a user interface of a dynamic coordination system in accordance with an example embodiment of the disclosed concept;

FIG. 11 is a flow chart for a method of dynamic coordination in accordance with an example embodiment of the disclosed concept.

DESCRIPTION OF THE PREFERRED EMBODIMENTS

Figure 1A:
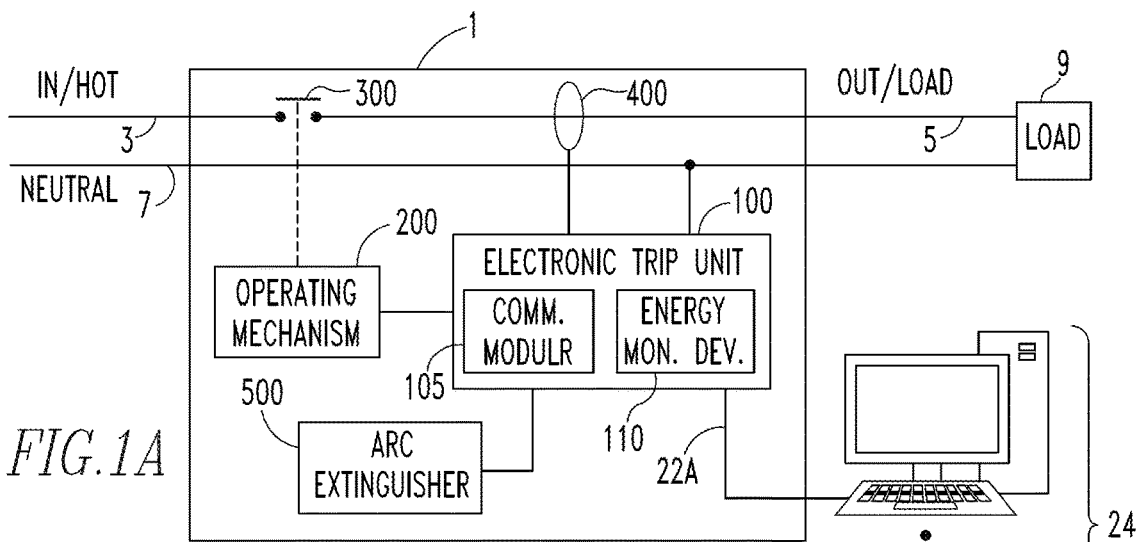
FIG. 1A is a diagram of an intelligent circuit breaker in accordance with an example embodiment of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, the term "number" shall mean one or an integer greater than one (i.e., a plurality).

Conventional coordination systems using a plurality of conventional circuit breakers face nuisance tripping as a result of, e.g., without limitation, a wrong setting selection of circuit breakers. For example, if an upstream circuit breaker is coupled to two downstream circuit breakers, and the upstream circuit breaker has a nominal current rating ($I_N$) of 30 Amp and a continuous current rating (IR) of $0.5 \times I_N$ (i.e., 15 Amp) and the downstream circuit breakers each have $I_N$ of 10 Amp and IR of $1 \times I_N$, then the sum of downstream circuit breakers current is 20 Amps, which exceeds the upstream circuit breaker's IR. In another example, an intelligent circuit breaker (an upstream or downstream circuit breaker) may have a wrong configuration (e.g., without limitation, an incorrect current setting, an incorrect pickup time, or an incorrect delay time), In these examples, since the conventional circuit breakers are not equipped with an automatic determination or alert capability of such incorrect configuration before a trip event occurs, there will be a fault event and a circuit breaker with an incorrect configuration setting will be tripped. The tripping of the circuit breaker(s) causes power loss at the outgoing node (i.e., the faulty downstream circuit breaker). Upon such power loss, the conventional circuit breakers require manual intervention to adjust incorrect configuration (e.g., the incorrect trip unit setting) of the upstream circuit breaker in order to establish coordination among the circuit breakers. Further, identifying the source of issue and the faulty circuit breaker poses a challenge to the conventional coordination system. In addition, the system needs to be shut down in order to perform manual adjustment of the trip unit setting, leading to a significant operational loss (e.g., without limitation costly downtime, lost production, spoilage of perishable inventories, etc.). Thus, there is an overall lack of pro-active, dynamic correction mechanism of configuration setting (e.g., without limitation, trip unit setting) of the circuit breakers, resulting in the significant operational losses.

Example embodiments of the disclosed concept address these issues. For example, the present disclosure provides a proactive, dynamic coordination system that automatically determines whether an adjustment to configuration setting of an intelligent circuit breaker is required based at least in part on circuit breaker information comprising real time data of downstream circuit breakers, automatically identifies the intelligent circuit breaker with the configuration setting required to be adjusted based on a determination that the adjustment is required, and automatically transmit an alert to a user, the alert comprising an indication that the adjustment to the configuration setting of the identified intelligent circuit breaker is required and device address of the identified intelligent circuit breaker. In some examples, such determination, identification, and transmission may also be made upon a user request. The circuit breaker information includes the real time data and function codes for reading the real time data. The real time data include at least real time current data and real time time data. The real time current data include at least nominal current rating $I_N$ and continuous current rating IR, and the real time time data include pickup time and delays. The real time data may also include real time voltage data or other protective settings. Based on the received circuit breaker information, the dynamic coordination system determines that the adjustment to the configuration setting of an intelligent circuit breaker is required. For example, if a sum of continuous current ratings (IR) of downstream circuit breakers exceeds the IR of respective upstream circuit breaker, then the dynamic coordination system determines that the upstream circuit breaker now has an incorrect current rating IR setting, which will result in a trip and power loss without corrective measure is taken. The dynamic coordination system then identifies the upstream circuit breaker with the incorrect current rating IR and automatically transmit an alert to the user wirelessly via, e.g., without limitation, Bluetooth®, SMS, etc., that the adjustment to the trip unit setting is required before a trip event occurs. The user may determine whether to remotely adjust the trip unit setting based on the alert using the dynamic coordination system or manually adjust the trip unit setting at the location of the upstream circuit breaker to be adjusted. Thus, by automatically determining and identifying an intelligent circuit breaker with configuration setting to be adjusted and automatically alerting the user the need to adjust configuration settings of the identified intelligent circuit breaker before an actual trip event happens, the dynamic coordination system preempts the trip event from occurring, prevents any power loss associated with the trip event, and averts significant operating loss as well as health and safety hazards. Further, the dynamic coordination system offers the user an option to adjust the configuration setting of the identified intelligent circuit breaker remotely using the dynamic coordination system installed in a user device coupled to the dynamic coordination system in a wired connection or wirelessly, thereby providing the user with flexibility, efficiency and time savings. Such remote adjustment capability avoids shutting down of the power distribution system as a result of having to manually adjust the configuration settings of the circuit breakers. However, the user may also manually adjust the configuration setting at the site of the identified circuit breaker as desired. In addition, the dynamic coordination system may be easily added on to existing energy monitoring devices (e.g., without limitation, firmware, software, codes, etc.). For any user device couplable to the intelligent circuit breakers, the dynamic coordination system may be added by updating the energy monitoring devices of the user devices by accessing, e.g., without limitation, a utility cloud, a memory device including the dynamic coordination system. The updates may include simply adding a couple of tabs (e.g., dynamic coordination indicator, dynamic coordination configurator, etc.) to the interface of the user interface of the energy monitoring device. For the electronic trip units of the intelligent circuit breakers, the energy monitoring device for the trip units are configured to include the dynamic coordination system at the factory setting. However, such inclusion is simple as it only requires updating the existing monitoring device, e.g., either by adding source codes or updating the energy monitoring device via, e.g., the utility cloud or storage device. While the trip unit may include a button as the dynamic coordination indicator, the indicator need not be physically present and simply be displayed as a virtual button on a user interface displayed on a display of the electronic trip unit. As such, no extra hardware is required to be added. Further, the dynamic coordination system may be used with any communication modules ((e.g., without limitation MODBUS® RTU, Ethernet, MODBUS® TCP, PROFIBUS, INCOM, etc.) available for the circuit breakers. Thus, the dynamic coordination system establishes an appropriate communications network (e.g., a client-server, a peer-to-peer, etc.) using the existing communication modules without having to install additional communication mechanism for dynamic coordination. Moreover, the dynamic coordination system allows the intelligent circuit breakers to communicate among one another automatically. Additionally, the dynamic coordination system is adaptable to the complexity of the power distribution system. That is, the dynamic coordination system may be used in a simple residential power system including a single downstream level or a complex industrial power system including numerous levels of circuit breakers.

FIG. 1A is a schematic diagram of an intelligent circuit breaker 1 in accordance with an example embodiment of the disclosed concept. The intelligent circuit breaker 1 is coupled to a HOT (LINE/IN) conductor 3, a LOAD (OUT) conductor 5, and a NEUTRAL conductor 7. The HOT conductor 3 may be electrically connected to a power source (not shown) such as 120 Vac residential power or another suitable power source. The AC power source may be coupled to a power supply circuit (not shown) within the intelligent circuit breaker 1. The LOAD conductor 5 may be electrically connected to a load 9, e.g., a light, a refrigerator, A/C, etc. The intelligent circuit breaker 1 may be directly connected to the NEUTRAL conductor 7 as shown in FIG. 1A. The NEUTRAL conductor 7 may be electrically coupled to the load 9 to complete the AC power circuit. The intelligent circuit breaker 1 is structured to trip open or switch open to interrupt current flowing to the load 9 in the case of a fault (e.g., a short circuit fault, a parallel arc fault, a permanent ground fault, etc.) or severe overload condition to protect the load 9.

The intelligent circuit breaker 1 is couplable to a user device 24 including an energy monitoring device via, e.g., without limitation, a USB cable 22A. In some examples, the user device 24 may be coupled wirelessly (e.g., Bluetooth®, WiFi, SMS, etc.), allowing the operator or user to monitor and control the intelligent circuit breaker 1 without having to connect to the intelligent circuit breaker 1 via the USB cable 22A. The user device 24 may be any user device (e.g., a PC, a cellular phone, etc.) and include, among others, a controller 160 as described with reference to FIG. 3. The controller 160 may include a processor 165, memory 170, and an energy monitoring device 110 including a dynamic coordination system 115. The user device 24 is described further in detail with reference to FIG. 3.

An intelligent circuit breaker 1 is part of a power distribution system 10',10",10'" as described with reference to FIGS. 4A-8. The intelligent circuit breaker 1 includes an electronic trip unit 100, operating mechanism 200, mechanical contacts 300, a current sensor 400 and an arc extinguisher 500.

Figure 2:
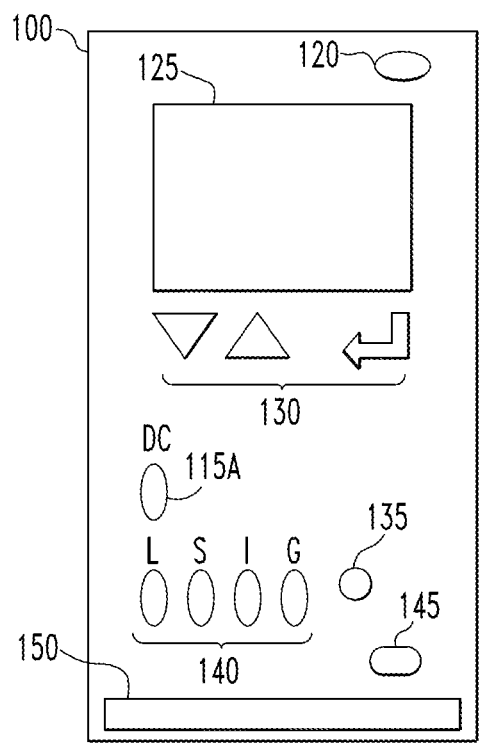
FIG. 2 is a diagram of a front view of an electronic trip unit in accordance with an example embodiment of the disclosed concept.

The electronic trip unit 100 is structured to control the operating mechanism 200 to trip open the mechanical contacts 300 based on a signal from the current sensor 400. The electronic trip unit 100 may be removable (e.g., exchangeable or interchangeable) and attached to a permanent frame rating module of the intelligent circuit breaker 1. The electronic trip unit 100 may include a communication module 105 and an energy monitoring device 110. The electronic trip unit 100 may also include a display 125 (e.g., without limitation, an LCD display), various indicators, navigators, or buttons 115A, 120, 130, 135, 140, a USB port 145, and a battery tray 150 as illustrated in FIG. 2, The electronic trip unit 100 may also include a processing unit (not shown) including a processor and a memory.

The communication module 105 may be any communication module available for communications among the intelligent circuit breakers 1. For example, the communication modules 105 may be MODBUS® RTU, Ethernet, MODBUS® TCP, PROFIBUS, INCOM that may be inbuilt in each circuit breaker.

The energy monitoring device 110 may be firmware, software, software application, codes, or instructions obtainable from a utility cloud or a USB drive for monitoring, controlling, or testing the intelligent circuit breaker 1. In some examples, the memory may include the energy monitoring device 110. The energy monitoring device 110 includes energy monitoring features such as a dynamic coordination system 115.

The dynamic coordination system 115 may be firmware, software, software application, codes, or instructions included in the energy monitoring device 110 at manufacturing. The dynamic coordination system 115 is structured to determine whether an adjustment to configuration setting of an intelligent circuit breaker(s) 1 is required based at least in part on circuit breaker information comprising at least real time data of downstream breakers, identify the intelligent circuit breaker 1 with the configuration setting required to be adjusted based on a determination that the adjustment is required, and transmit an alert to a user, the alert including an indication that the adjustment to the configuration setting of the identified intelligent circuit breaker is required and device address of the identified intelligent circuit breaker. The dynamic coordination system 115 performs the determination, identification, and transmission of the alert automatically. In some example, the user may also request such performances by the dynamic coordination system 115.

The determining whether an adjustment to configuration setting of an intelligent circuit breaker is required includes: comparing present trip unit setting associated with at least one of current rating or time setting of each intelligent circuit breaker to respective required trip unit setting associated with the at least one of current rating or time setting, determining whether an adjustment to trip unit setting of any intelligent circuit breaker is required based on a comparison result that the present trip unit setting does not satisfy the respective required trip unit setting, and determining that the adjustment to the trip unit setting of one or more intelligent circuit breakers is required based on a determination that the present trip unit setting of the one or more intelligent circuit breakers does not satisfy the respective required trip unit setting. If the identified intelligent circuit breaker is an upstream circuit breaker, the determining whether to adjust the configuration setting includes: comparing current rating of each upstream circuit breaker and a sum of current ratings of the respective downstream circuit breakers, determining whether the current rating of each upstream circuit breaker is greater than the sum of the current ratings of the respective downstream circuit breakers, and determining that an adjustment to trip unit setting of the upstream circuit breaker is required based on a determination that the current rating of the upstream circuit breaker is not greater than the sum of the current ratings of the respective downstream circuit breakers.

The dynamic coordination system 115 transmits the alert to the user device 24 in a wired connection via a USB cable 22A or wirelessly (e.g., without limitation, via Bluetooth®, SMS, etc.). Upon receiving the alert, the user may remotely or manually adjust the configuration setting of the identified circuit breaker. The intelligent circuit breaker 1 has been previously configured by the user for energy monitoring (e.g., protective settings, factory settings, etc.) and dynamic coordination. The configurations for dynamic coordination includes specifying a different device address for each intelligent circuit breaker, determining a number of levels and a number of intelligent circuit breakers in each level, establishing at least one upstream circuit breaker in each level, and selecting respective downstream circuit breakers for each upstream circuit breaker based on a user input. The dynamic coordination system is described further with reference to FIGS. 3 and 9.

The processor may be, for example and without limitation, a microprocessor, a microcontroller, or some other suitable processing device or circuitry. The memory can be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory.

The operating mechanism 200 is structured to open the mechanical contacts 300 in response to a signal from the electronic trip unit 100 based on the current measured by the current sensor 400. Opening the mechanical contacts 300 provides galvanic isolation between the power source and the load 9. For example and without limitation, the operating mechanism 200 is structured to cause mechanical contacts 300 to open by moving a movable arm to cause the mechanical contacts 300 to separate. The mechanical contacts 300 may include a primary contact and a secondary contact. The current sensor 400 may be, e.g., without limitation, a Rogowski coil (e.g., two coils including one coil on an iron core and the other coil on an air core) and structured to measure the AC current flowing through the intelligent circuit breaker 1 to the load 18. The current sensor 400 may be installed on the load terminals 14. As the current starts to flow through the intelligent circuit breaker 1, the one coil on the iron core generates a current which powers the electronic trip unit 100. The other coil on the air core provides the signal for determining the current through the intelligent circuit breaker 1.

The arc extinguisher 500 may be an arc chamber for each pole of the intelligent circuit breaker 1 and include an arc chute mounted around the mechanical contacts 300 (e.g., primary contacts). The arc extinguisher 500 is structured to extinguish arcs and channel gases out of the intelligent circuit breaker during interruption.

Figure 1B:
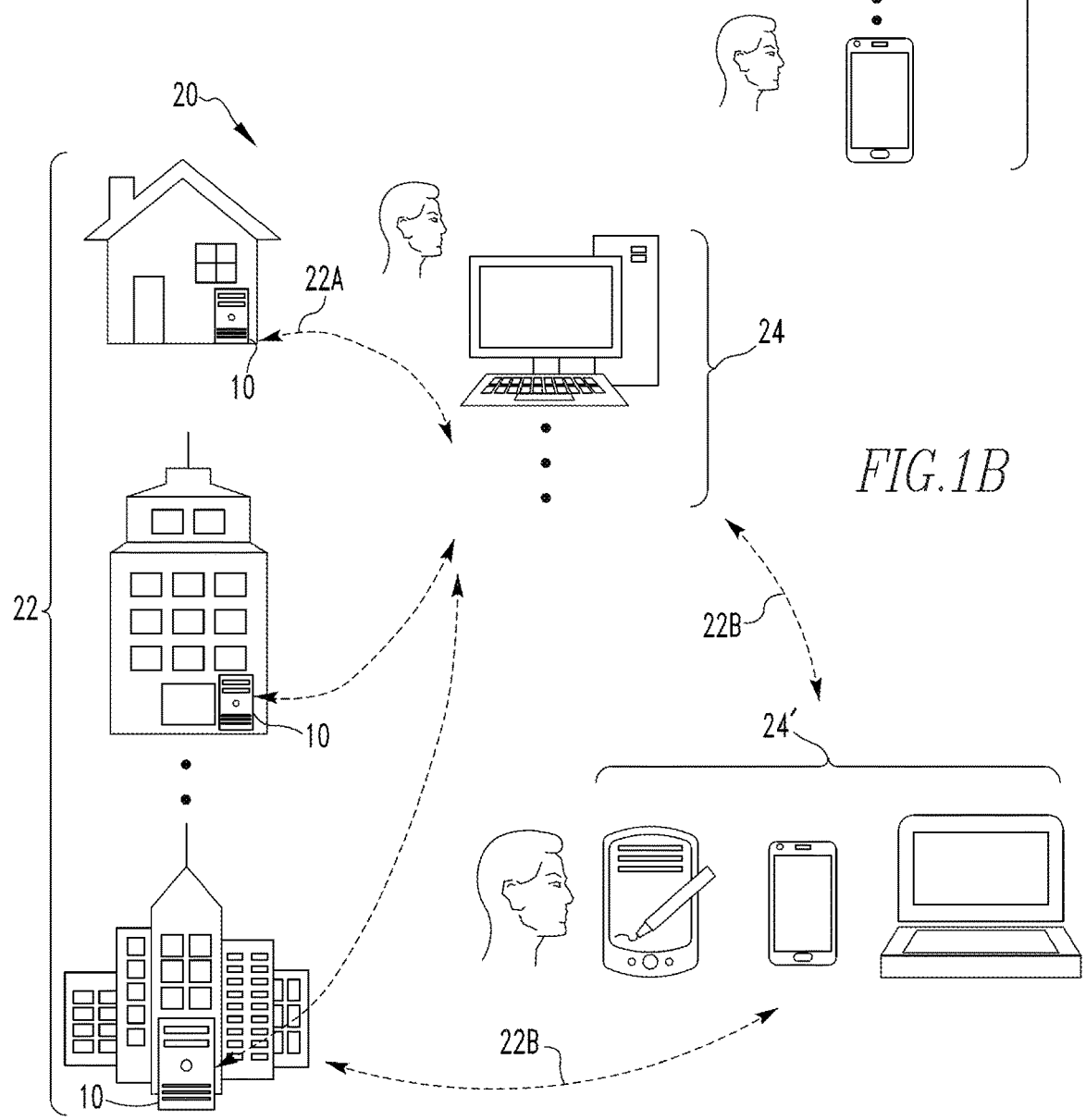
FIG. 1B is a diagram of a power system in accordance with an example embodiment of the disclosed concept.

FIG. 1B is a diagram of an example power system 20 in accordance with an example embodiment of the disclosed concept. The power system 20 includes facilities 22 (e.g., without limitation, a residential home, office building, or industrial complex, etc.) including a power distribution system 10, a user device 24 and an end user device 24' communicatively coupled to the power distribution system 10 or the user device 24. The facilities 22 may range from a family home to industrial complex as shown in FIG. 1B. The power distribution system 10 includes a first intelligent circuit breaker 1 which includes a first electronic trip unit 100 including a first communication module 105 and a plurality of second intelligent circuit breakers 1 each including a second electronic trip unit 100 including a second communication module 105 as illustrated in FIGS. 4A-8. The first intelligent circuit breaker 1 may be the sole circuit breaker in a top level of the power distribution system 10. The first and second communication modules 105 may be any communication module (e.g., without limitation MODBUS® RTU, Ethernet, MODBUS® TCP, PROFIBUS, INCOM, etc.) available for the circuit breakers. The user device 24, 24' may be any type of user device (e.g., without limitation, a PC, a PDA, a laptop, a mobile phone, etc.) capable of receiving and transmitting messages from the energy monitoring device 110 wirelessly or in wired connection. For example, an operator authorized to access the power distribution system 10 may couple the user device 24 to the intelligent circuit breakers 1 via a USB cable 22A plugged in the USB port 145 (as shown in FIG. 2) or wirelessly (via, e.g., Bluetooth®, SMS, WiFi, etc.). In this example, the operator may be an end user. The user device 24' may be coupled either to the intelligent circuit breakers 1 or a user device 24 (where, e.g., the end user is not the operator), and communicate with the intelligent circuit breakers 1 wirelessly ((via, e.g., Bluetooth®, SMS, WiFi, LTE, LTE-A, New Radio, etc.). The user may remotely adjust the configuration setting of the identified circuit breaker with incorrect configuration setting using the dynamic coordination system 115 included in the user device 24, 24'. The dynamic coordination system 115 included in the electronic trip unit 100 and the user device 24,24' is the same or similar with minor differences.

For a simple residential or office facility, a first embodiment provides dynamic coordination capability as described with reference to FIGS. 4A-B. In this embodiment, the power distribution system 10' includes the first intelligent circuit breaker 1 arranged as a sole client and upstream circuit breaker in a first level and the second intelligent circuit breakers 1 arranged as servers in a single downstream level below the first level. The first and second communication modules 105 may include, e.g., MODBUS® RTU, which establishes a client-server network. MODBUS® RTU is a communication module allowing electronic devices to communicate with one another over serial data lines (e.g., asynchronous serial data lines). As such, the first intelligent circuit breaker 1 is structured to transmit a request to the second intelligent circuit breakers 1 for circuit breaker information including real time data, the second intelligent circuit breaker 1 is structured to receive the request and transmit the circuit breaker information to the first intelligent circuit breaker in response to the request, and the first intelligent circuit breaker 1 is further structured to receive the circuit breaker information. Thus, in the first embodiment, the server-second intelligent circuit breakers 1 may only transmit the circuit breaker information when requested by the client-first intelligent circuit breaker 1. The circuit information includes at least the real time data and function codes for reading the real time data. The real time data includes at least real time current data and real time time data. The real time current data includes at least nominal current rating and continuous current rating. The real time time data includes at least pickup time and delay. The real time data may also include real time voltage data or other protective settings. The first intelligent circuit breaker 1 (i.e., the dynamic coordination system 115 of the first intelligent circuit breaker 1) receives the circuit breaker information including the real time data and determines whether an adjustment to configuration setting of an intelligent breaker(s) 1 is required based at least in part on the circuit breaker information of all downstream circuit breakers 1 in the power distribution system 10', identifies the intelligent circuit breaker 1 with the configuration setting required to be adjusted based on a determination that the adjustment is required, and transmits an alert to the user device 24,24' communicatively coupled to the first and second intelligent circuit breakers 1, the alert comprising an indication that the adjustment to the configuration setting of the identified intelligent circuit breaker 1 is required and device address of the identified intelligent circuit breaker 1.

Figure 5:
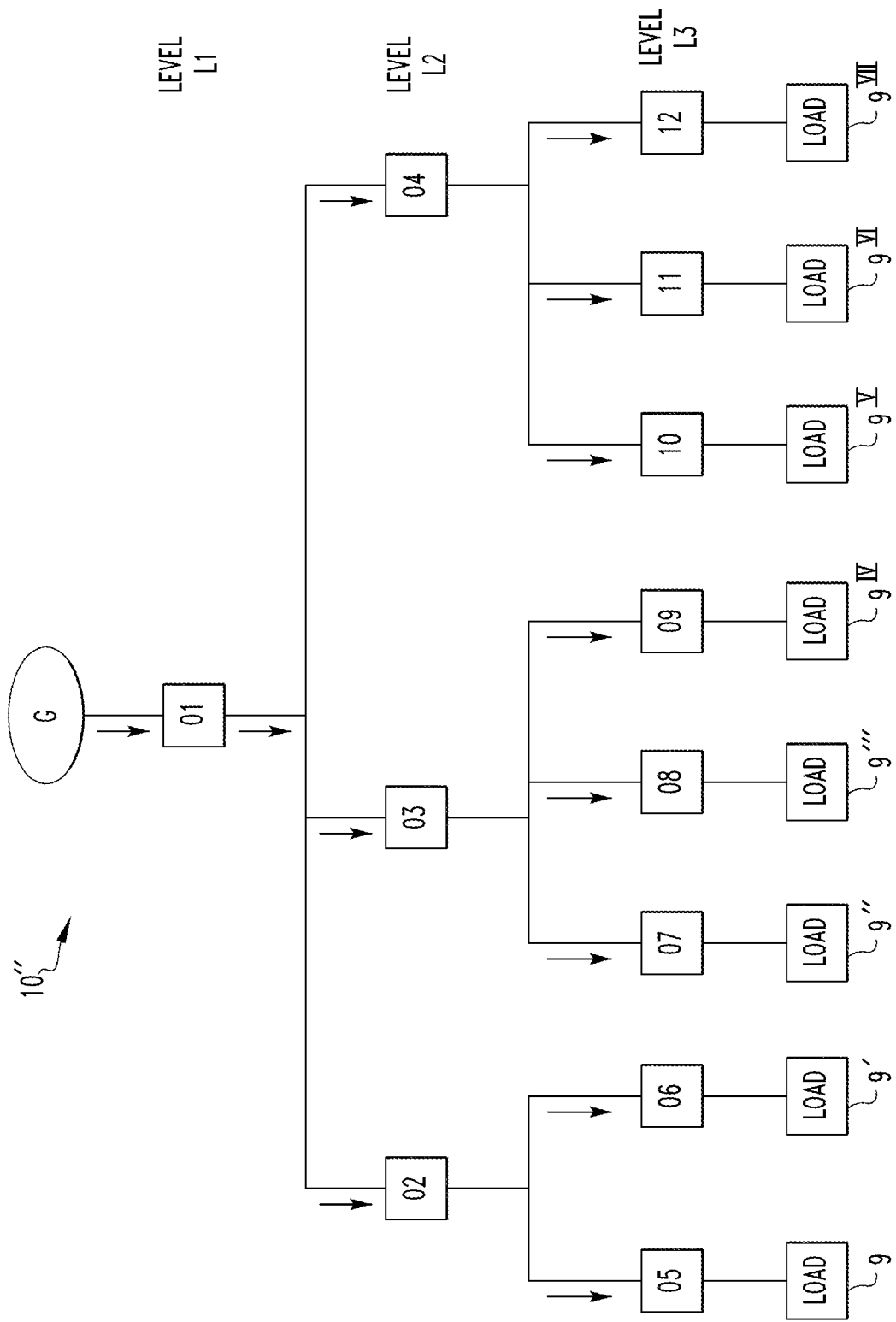
FIG. 5 is a diagram of an example power distribution system in accordance with an example embodiment of the disclosed concept.
Figure 6:
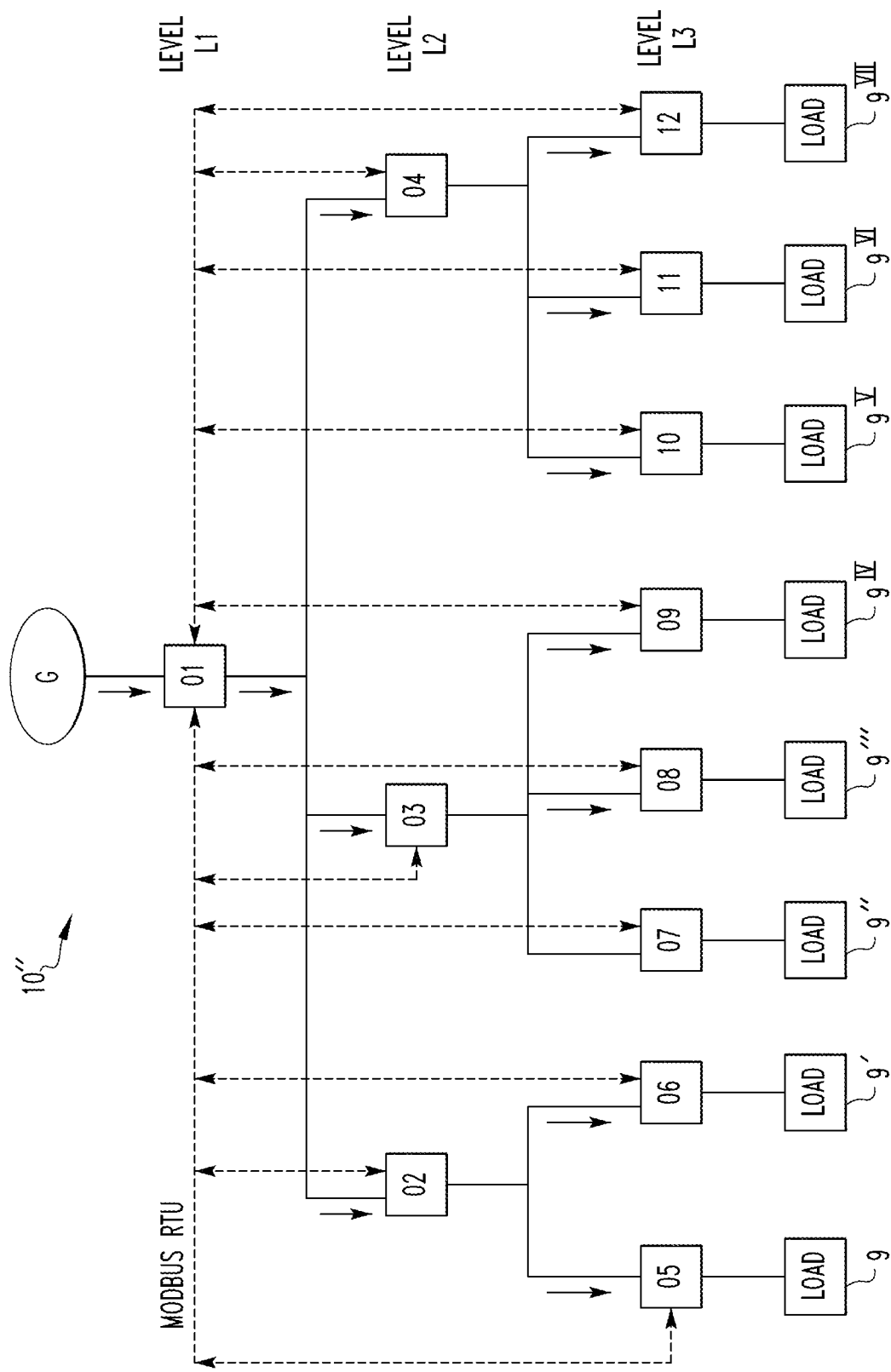
FIG. 6 is a diagram of an example power distribution system with a communication module in accordance with an example embodiment of the disclosed concept.

For larger facilities such as industrial complex 22, second or third embodiments provide dynamic coordination capability for a more complex power distribution system 10",10''' as illustrated in FIGS. 5-8. In the second and third embodiments, the power distribution system 10",10''' includes a first intelligent circuit breaker 1 as sole client and circuit breaker in the first level, and the second intelligent circuit breakers 1 as servers arranged in remaining levels. In the second embodiment (as illustrated in FIGS. 5-6), the first and second communication modules 105 may also include, e.g., MODBUS® RTU, which again establishes a client-server network. As such, the first intelligent circuit breaker 1 is structured to transmit a request to the second intelligent circuit breakers 1 for circuit breaker information including real time data, the second intelligent circuit breaker 1 is structured to receive the request and transmit the circuit breaker information to the first intelligent circuit breaker in response to the request, and the first intelligent circuit breaker 1 is further structured to receive the circuit breaker information. Thus, in the second embodiment, the server-second intelligent circuit breakers 1 may only transmit the circuit breaker information when requested by the client-first intelligent circuit breaker 1. The first intelligent circuit breaker (i.e., dynamic coordination system 115 of the first intelligent circuit breaker 1) receives the circuit breaker information including the real time data and determines whether an adjustment to configuration setting of an intelligent circuit breaker(s) 1 is required based at least in part on the circuit breaker information of all downstream circuit breakers 1 in the power distribution system 10", identifies the intelligent circuit breaker 1 with the configuration setting required to be adjusted based on a determination that the adjustment is required, and transmits an alert to the user device 24,24' communicatively coupled to the first and second intelligent circuit breakers 1, the alert comprising an indication that the adjustment to the configuration setting of the identified intelligent circuit breaker 1 is required and device address of the identified intelligent circuit breaker 1.

Figure 7:
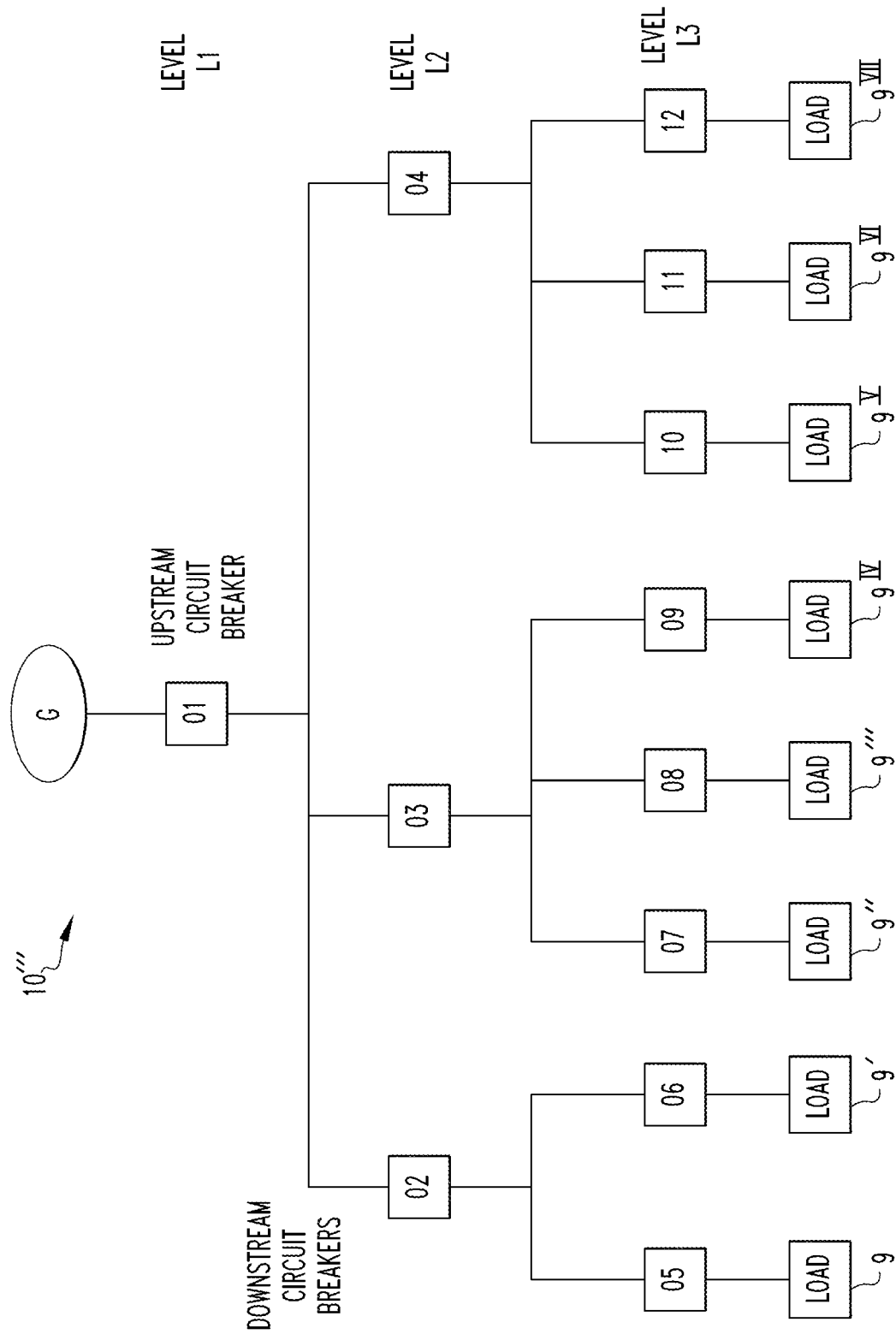
FIG. 7 is a diagram of an example power distribution system in accordance with an example embodiment of the disclosed concept.

In the third embodiment (as illustrated in FIGS. 7-8), the first and second communication modules 105 include Ethernet which may establish a peer-to-peer network, allowing the first and second intelligent circuit breakers 1 to communicate with one another as peers over the Ethernet (via, e.g., without limitation, MODBUS® TCP or GOOSE messaging). That is, the second intelligent circuit breakers 1 transmit the circuit information including the real time data to the first intelligent circuit breaker 1 without having to wait to receive a request for the circuit breaker information including the real time data from the first intelligent circuit breaker 1. The first intelligent circuit breaker 1 receives the circuit breaker information and determines whether an adjustment to configuration setting of an intelligent breaker(s) 1 is required based at least in part on the circuit breaker information, identifies the intelligent circuit breaker 1 with the configuration setting required to be adjusted based on a determination that the adjustment is required, and transmits an alert to the user device 24,24' communicatively coupled to the first and second intelligent circuit breakers 1, the alert comprising an indication that the adjustment to the configuration setting of the identified intelligent circuit breaker 1 is required and device address of the identified intelligent circuit breaker 1.

FIG. 2 is a front view of an example electronic trip unit 100 in accordance with an example embodiment of the disclosed concept. The electronic trip unit 100 is structured to control the operating mechanism 200 to trip open the mechanical contacts 300 based on a signal from the current sensor 400 as described with reference to FIG. 1. That is, the electronic trip unit 100 receives a signal from the current sensor 400, analyzes the signal and if the signal indicates that the real time current and time data exceed the current level and time delay settings, then the electronic trip unit 100 trips the intelligent circuit breaker 1 by opening the mechanical contacts 300 via the operating mechanism 200. The electronic trip unit 100 may include a status indicator 120, a display 125, navigators 130, a dynamic coordination indicator 115A, a USB port 145, a pickup or cause of trip indicators 140, a reset button 135, and a battery tray 150 in addition to the communication module 105, the energy monitoring device 110, and the processing system as previously described with reference to FIG. 1A. This is for illustrative purposes only, and it will be understood that the electronic trip unit 100 may include more or less other feature components depending on circumstances, manufacturers, or user preferences.

The status indicator 120 indicates the status (e.g., a green light for normal operation, red light for a firmware error, calibration error, coil error or operating mechanism error associated with the electronic trip unit 100). The display 125 displays, e.g., without limitation, a loading screen upon the initial power-on, the main menu upon loading, and submenus. The main menu lists, e.g., without limitation, summary of the electronic trip unit settings and features, metering information, timeline of the usage of the electronic trip unit 100, health of the intelligent circuit device 1, current and/or voltage waveforms, etc. The features include, e.g., without limitation, available language options, communication modules, thermal memory, long delay curve selection, neutral pickup, power feed (e.g., forward or reverse), zone selective interlock capability, maintenance mode pickup, user information editing, etc. The submenus include further options for a specific feature. For example, for the long delay curve selection, the submenu may list selection options, e.g., without limitation, 12t, 14t, 10.5t, 1t, etc. The menus may be accessed by using the navigators 130.

The dynamic coordination indicator 115A, when lit, indicates that the intelligent circuit breaker 1 has the dynamic coordination feature. The dynamic coordination feature is novel and may be added to the electronic trip unit 100 by installing it within the energy monitoring device 110 at manufacturing. While FIG. 2 shows the dynamic coordination indicator 115A added as a button, it may not be physically added to the trip unit 100, but rather be displayed as a virtual indicator on the display 125. As such, no additional hardware is required to be added for dynamic coordination. Upon such installment, the dynamic coordination system 115 automatically determines whether adjustment to configuration setting of an intelligent circuit breaker is required based on the circuit breaker data, identify the intelligent circuit breaker with the configuration setting required to be adjusted, and transmit an alert to the user device 24,24' wirelessly or in wired connection. The user device 24,24' may also include the energy monitoring device 110 including the dynamic coordination system 115 as described with reference to FIG. 3. The dynamic coordination system 115 in the electronic trip unit 100 and the user device 24,24' may be the same or similar with minor differences. Upon receiving the alert, the operator or user may remotely adjust the configuration setting of the identified circuit breaker remotely using the dynamic coordination system 115 in the user device 24,24' or manually adjust the configuration setting at the location of the identified circuit breaker using the electronic trip unit 100.

The pickup or cause-of-trip indicators 140 are lit if a current level pickup setting is exceeded as a result of, e.g., without limitation, long delay trip or over-temperature trip, short delay trip or mechanism error, instantaneous trip, or ground trip or ground alarm condition. The reset button 135 may be pressed to reset the pickup or cause-of-trip indicators 140. In some examples, the electronic trip unit 100 may also include rotary switches, e.g., without limitation, pickup switches setting the pickup levels as a function of the breaker ratings or time switches for setting the responses in seconds (s). The battery tray 150 is structured to hold a battery for powering the pickup or cause-of-trip indicators 140 when the electronic trip unit 100 is not powered on.

Figure 3:
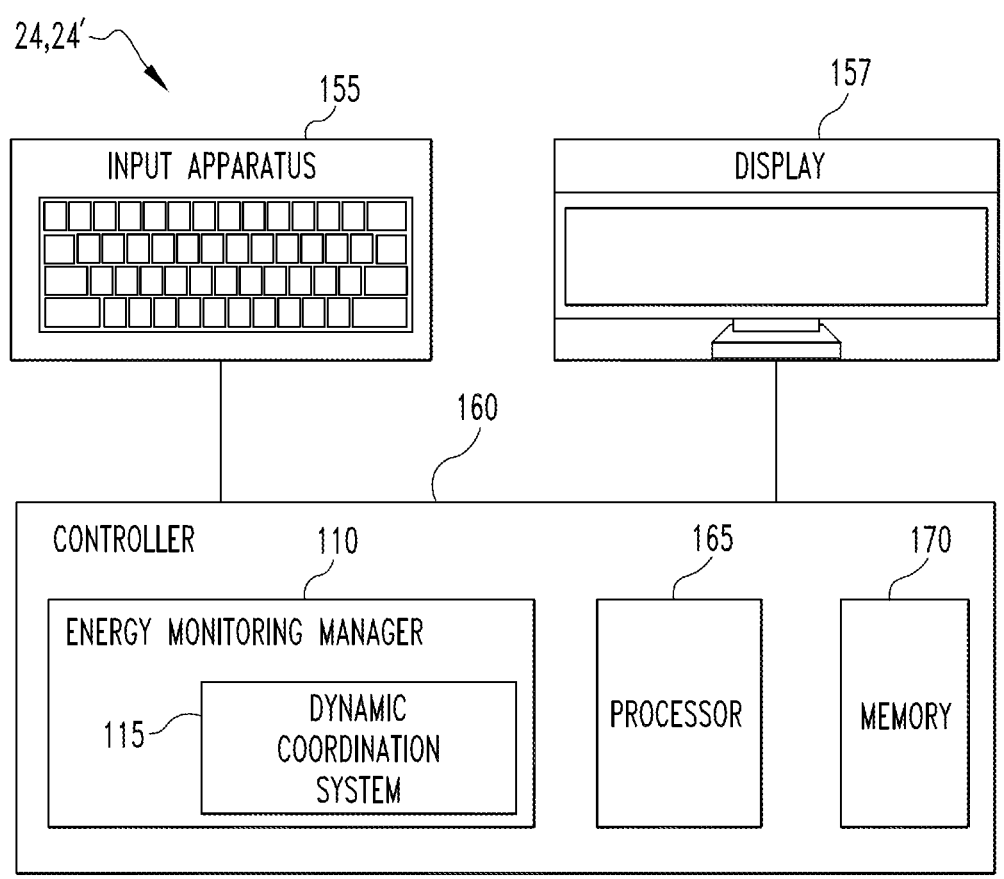
FIG. 3 is a block diagram of an energy monitoring device in accordance with an example embodiment of the disclosed concept.

FIG. 3 is a block diagram of a user device 24,24' in accordance with an example embodiment of the disclosed concept. As seen in FIG. 3, the exemplary user device 24,24' is a PC or laptop computer and includes an input apparatus 155 (which in the illustrated embodiment is a keyboard), an output apparatus 575 (which in the illustrated embodiment is an LCD), and a controller 160. However, the user device 24,24' may be any user device capable of communicating with the first and second intelligent circuit breakers 1 in wired connection or wirelessly. A user is able to provide input into the controller 160 using the input apparatus 155, and the controller 160 provides output signals to display 157 to enable the display 157 to display real time information, e.g., without limitation, real time current data, real time voltage data, real time time data for the intelligent circuit breaker 1. The real time current data includes continuous current rating IR, nominal current rating $I_N$, interrupting rating, short-time withstand current, etc. The real time voltage data includes voltage rating, interrupting rating, etc. The real time time data includes pickup time, delays, etc. The real time data may also include voltage ratings or other protective settings.

The controller 160 includes an energy monitoring device 110 for controlling, monitoring, and/or adjusting the intelligent circuit breaker 1. The monitoring features include the trip unit features, e.g., without limitation, a maintenance mode, ground protection, type of available communications adapter modules (CAM), or a dynamic coordination system 115. A maintenance mode relates to arc flash maintenance capability and may include, e.g., an Arc Flash Reduction Maintenance System™. A ground protection relates to the ground fault protection provided for the intelligent circuit breaker 1 in accordance with country or regional requirements. A CAM feature relates types of CAM available (e.g., without limitation, MODBUS® RTU (remote terminal unit), MODBUS® TCP (transmission control protocol), Ethernet, PROFIBUS, INCOM, etc.) for the intelligent circuit breakers 1 to communicate among one another. The dynamic coordination system 115 may already be part of the energy monitoring device 110 or incorporated into the energy monitoring device 110 by updating the energy monitoring device 110. Upon the incorporation, the intelligent circuit breakers 1 in the power distribution system 10 are configured for dynamic coordination based on a user input. The dynamic coordination configuration includes specifying a different device address for each intelligent circuit breaker 1, determining a number of levels and a number of intelligent circuit breakers 1 in each level, establishing the at least one upstream circuit breaker 1 in each level, and selecting respective downstream circuit breakers for each upstream circuit breaker based on a user input. Upon configuration, the dynamic coordination system 115 is structured to determine whether an adjustment to configuration setting of an intelligent breaker(s) 1 is required based at least in part on the circuit breaker data including real time data of downstream circuit breakers 1 in the power distribution system 10, identify the intelligent circuit breaker 1 with the configuration setting required to be adjusted based on a determination that the adjustment is required, and transmit an alert to a user device 24,24' communicatively coupled to the first and second intelligent circuit breakers 1, the alert including an indication that the adjustment to the configuration setting of the identified intelligent circuit breaker 1 is required and device address of the identified intelligent circuit breaker 1. The user may have previously configured protective settings for the intelligent circuit breaker 1, and with the use of the dynamic coordination system 115, the user is now able to view real time data of each downstream circuit breaker 1 and adjust an incorrect configuration setting of an intelligent circuit breaker real time remotely using the dynamic coordination system 115 of the user device 24,24' or manually at the site of the identified intelligent circuit breaker.

The controller 160 also includes a processor and a memory. The processor may be, for example and without limitation, a microprocessor (μP), a microcontroller, or some other suitable processing device, that interfaces with the memory. The memory can be any one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The memory has stored herein a number of routines, instructions, or codes that are executable by the processor. One or more of the routine implement (by way of computer/processor executable instructions) at least one embodiment of the method discussed in detail herein for energy monitoring and dynamic circuit breaker coordination.

Figure 4B:
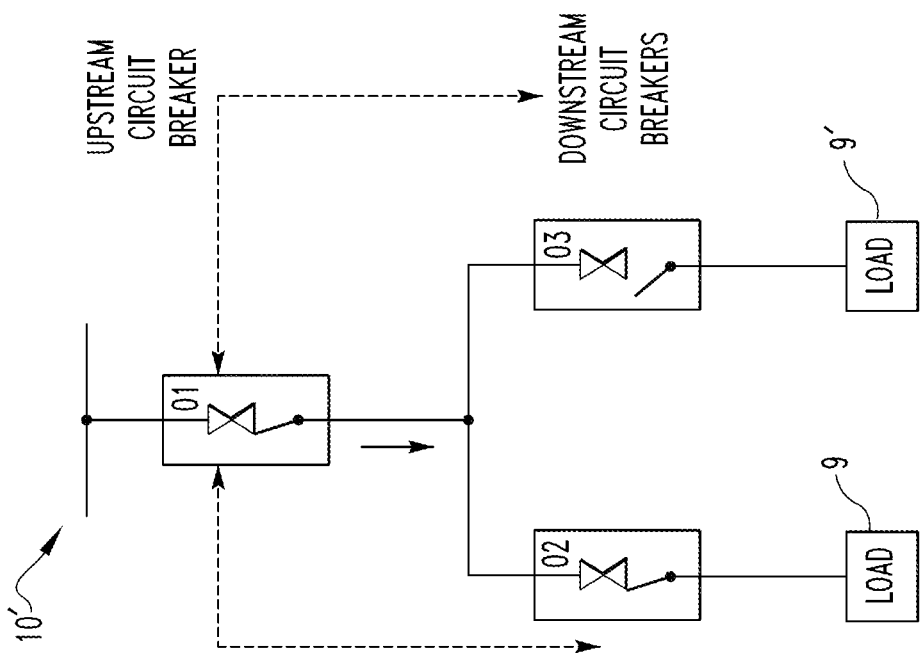
FIGS. 4A-B illustrate schematic diagrams of example power distribution systems in accordance with an example embodiment of the disclosed concept.
Figure 4A:
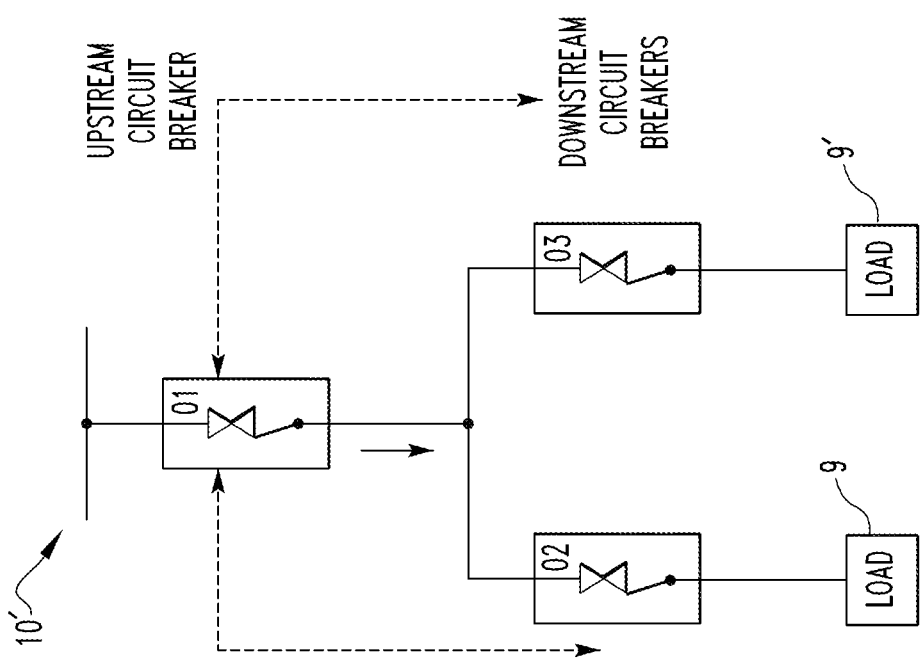

FIGS. 4A-B illustrates a power distribution system 10' in accordance with an example first embodiment of the disclosed concept. In this embodiment, the user has configured the intelligent circuit breakers 1 for dynamic coordination for facilities requiring a simple power distribution system. First, the user specified a different device address (01,02,03) for each circuit breaker in the power distribution system 10'. In this example, the device address is numeric (e.g., 01, 02, etc.), however, this is for illustrative purposes only and the device address may be, e.g., alphabetic, alphanumeric, or any other combination thereof. The user then determined that there will be two levels of circuit breakers in the power distribution system 10' with the intelligent circuit breaker 01 as a sole upstream circuit breaker in the first level (L1) and the intelligent circuit breakers 02,03 as the downstream circuit breakers in the single-downstream circuit breaker level (L2). As such, the downstream circuit breakers 02,03 receive current from the upstream circuit breaker 01 and supply power to loads 9 and 9' respectively. It will be understood that there may be more or less downstream circuit breakers in L2 depending on the number of loads within the power distribution system 10'. In FIGS. 4A-B, the available CAM is MODBUS® RTU (denoted by the dashed arrows) establishing a client-server (slave-master) network. In this embodiment, the upstream circuit breaker 01 is the sole client and the downstream circuit breakers 02,03 are servers. As such, the upstream circuit breaker 01 transmits a request to the downstream circuit breakers 02,03 for real time data including current data and time data using MODBUS® RTU. In response, the downstream circuit breakers 02,03 transmit the requested real time data to the upstream circuit breaker 01 using MODBUS® RTU.

FIG. 4A illustrates the power distribution system 10' in which the circuit breaker setting for all circuit breakers is correctly configured, and thus, there is no tripped circuit breaker. FIG. 4B illustrates the power distribution system 10' including the upstream circuit breaker 01 with an incorrect trip unit setting. In this example, the upstream circuit breaker has nominal current rating ($I_N$) of 30 Amp and continuous current rating (IR) of $0.5 \times I_N$ (i.e., 15 Amp) and the downstream circuit breakers 02,03 each have $I_N$ of 10 Amp and IR of $1 \times I_N$. Thus, the sum of currents IR of the downstream circuit breakers 02,03 is 20 Amps, which exceeds the upstream circuit breaker's IR. As such, if the IR of the upstream circuit breaker 01 is not adjusted in time, there will be a fault near one of the downstream circuit breakers 02,03 and the faulty downstream circuit breaker 03 will be tripped as shown in FIG. 4B. As a result of this tripping, there will be power loss at the outgoing node 03. Conventionally, the user is required to manually adjust the trip unit setting IR of the upstream circuit breaker 01 to reestablish the coordination and the power distribution system to work. Such manual adjustment may require shutting down of the power distribution system itself. However, the dynamic coordination system 115, when connected to the intelligent circuit breakers 01,02,03, automatically determines whether an adjustment to configuration setting of an upstream breaker(s) 1 is required based at least in part on real time data of all downstream circuit breakers 1 in the power distribution system 10 by comparing current rating of the upstream circuit breaker 01 and a sum of current ratings of the downstream circuit breakers 02,03, determining whether the current rating of upstream circuit breaker 01 is greater than the sum of the current ratings of the downstream circuit breakers 02,03, and determining that an adjustment to trip unit setting of the upstream circuit breakers 01 is required based on a determination that the current rating of the upstream circuit breakers 01 is not greater than the sum of the current ratings of the downstream circuit breakers 02,03. The dynamic coordination system 115 next identifies the upstream circuit breaker 01 with the configuration setting required to be adjusted based on a determination that the adjustment is required, and transmits an alert to a user device 24,24' communicatively coupled to the first and second intelligent circuit breakers 1. The alert includes an indication that the adjustment to the configuration setting of the identified upstream circuit breaker 01 is required and device address of the identified upstream circuit breaker 1. In some examples, the dynamic coordination system 115 may determine that the adjustment to any intelligent circuit breaker is required based on incorrect current rating, incorrect time setting, or any other protective setting that may be adjusted via the dynamic coordination system 115. That is, the dynamic coordination system 115 may first compare present trip unit setting associated with at least one of current rating or time setting of each circuit breaker to respective required trip unit setting associated with the at least on of current or time setting, determine whether an adjustment to trip unit setting of any intelligent circuit breaker is required based on a comparison result that the present trip unit setting does not satisfy the respective required trip unit setting, and determining that the adjustment to the trip unit setting of one or more intelligent circuit breakers is required based on a determination that the current trip setting of the one or more intelligent circuit breakers do not satisfy the respective required trip unit setting. Upon receiving the alert, the user may adjust the configuration setting of the identified intelligent circuit breaker remotely or manually.

FIG. 5 illustrates a power distribution system 10" in accordance with an example second embodiment of the disclosed concept. In this embodiment, the user has configured the intelligent circuit breakers 1 for dynamic coordination for facilities requiring a more complex power distribution system. First, the user specified a different device address (01-12) for each circuit breaker in the power distribution system 10". The user then determined that there will be three levels of circuit breakers in the power distribution system 10″ with the intelligent circuit breaker 01 as a sole circuit breaker in the first level (L1), the intelligent circuit breakers 02-04 downstream to the circuit breaker 01 in the second level (L2), and the intelligent circuit breakers 05-12 arranged in the third level (L3) with circuit breakers 05-06 downstream to circuit breaker 02, circuit breakers 07-09 downstream to circuit breaker 03 and circuit breakers 10-12 downstream to circuit breaker 04. Each circuit breakers 05-12 at the bottom layer supplies power to respective loads 9-9$^{VII}$. It will be understood that there may be more levels and/or more or less downstream circuit breakers in each level, depending on the needs (e.g., the number of loads within the power distribution system 10′), circumstances, or preferences. In this embodiment, the available CAM is also MODBUS® RTU (denoted by the dashed arrows) establishing a client-server (slave-master) network. The circuit breaker 01 is the sole client and all downstream circuit breakers 02-12 are servers. As such, the upstream circuit breaker 01 transmits a request to the downstream circuit breakers 02-12 for real time data including current data and time data using MODBUS® RTU. In response, the downstream circuit breakers 02-12 transmit the requested real time data to the upstream circuit breaker 01 using MODBUS® RTU.

The dynamic coordination system 115, when connected to the intelligent circuit breakers 01-12, automatically determines whether an adjustment to configuration setting of an upstream breaker(s) 1 is required based at least in part the circuit breaker information of downstream circuit breakers 02-12 in the power distribution system 10″. For example, the dynamic coordination system 115 compares current rating of the upstream circuit breaker 01 and a sum of current ratings of the downstream circuit breakers 02-4, current rating of the upstream circuit breaker 02 and a sum of current ratings of the downstream circuit breakers 05-06, current rating of the upstream circuit breaker 03 and a sum of current ratings of the downstream circuit breakers 07-09, and current rating of the upstream circuit breaker 04 and a sum of current ratings of the downstream circuit breakers 10-12. Then, the dynamic coordination system 115 determines whether the current rating of any upstream circuit breaker 01-04 is greater than the sum of the current ratings of the respective downstream circuit breakers 02-12, and determines that an adjustment to trip unit setting of an upstream circuit breakers is required based on a determination that the current rating of the one or more upstream circuit breakers is not greater than the sum of the current ratings of the respective downstream circuit breakers. For example, the upstream circuit breaker 02 has nominal current rating ($I_N$) of 30 Amp and continuous current rating ($I_R$) of 0.5×$I_N$ (i.e., 15 Amp) and the downstream circuit breakers 05,06 each have $I_N$ of 10 Amp and $I_R$ of 1×$I_N$. Thus, the sum of currents $I_R$ of the downstream circuit breakers 05,06 is 20 Amps, which exceeds the upstream circuit breaker's $I_R$. In this example, the dynamic coordination system 115 determines that the adjustment to the current rating $I_R$ of the upstream circuit breaker 02 is required, and thus transmits an alert to the user device 24,24′ that the adjustment is required and provides the identity of the upstream circuit breaker 02 whose configuration setting is required to be adjusted. In some examples, the dynamic coordination system 115 may determine that the adjustment to an intelligent circuit breaker 01 is required based on incorrect current rating, incorrect time setting, or any other protective or configuration settings that may be adjusted via the dynamic coordination system 115. The user may act immediately upon receiving the alert to adjust the trip unit setting using the dynamic coordination system 115 remotely or manually at the site of the identified intelligent circuit breaker. Thus, the novel dynamic coordination system 115 not only eliminates a requirement to manually adjust the trip unit setting of the identified circuit breaker, but also proactively and dynamically preempts any trip event as a result of, e.g., an incorrect trip unit setting, thereby preventing any power loss or resultant operating loss which may be significant for a complicated industrial complex. Further, even if a trip event does occur, the dynamic coordination system 115 provides the user convenience and flexibility of remotely adjusting the incorrect trip unit setting wherever he/she is. The user may still manually adjust the incorrect trip unit setting at the site of the identified circuit breaker if he/she desires. While FIG. 5 shows two downstream circuit breaker levels L2, L3 with three downstream circuit breakers in L2 and 8 downstream circuit breakers in L2, the user may define as many downstream circuit breaker levels and as many downstream circuit breakers assigned to each level or an upper circuit breaker as desired and in accordance with MODBUS® requirement (e.g., maximum 247 electronic devices on one data link).

FIG. 6 illustrates a power distribution system 10″ in accordance with an example embodiment of the disclosed concept. The circuit breakers 01-12 are intelligent circuit breakers 1 as described with reference to FIG. 1. The upstream circuit breaker 01 and downstream circuit breakers 02-12 communicate via MODBUS® RTU in serial lines denoted in the dashed arrows. MODBUS® RTU is a communication module allowing electronic devices to communicate with one another over serial data lines (e.g., asynchronous serial data lines). While FIG. 6 shows MODBUS® RTU as the application-layer communications protocol among the circuit breakers 01-12, other appropriate communication adapter modules (e.g., INCOM, PROFIBUS, etc.) may be used as preferred or available.

FIGS. 7-8 illustrate a power distribution system 10‴ in accordance with an example third embodiment of the disclosed concept. The circuit breakers 01-12 are intelligent circuit breakers 1 as described with reference to FIG. 1. The architectural structure of the power distribution system 10‴ in FIGS. 7-8 is the same as that of the power distribution system 10″ of FIGS. 5-6, and thus, the structural description is omitted for brevity. It will be noted, however, the structure may be different depending on the circumstances, needs, or preferences. The power distribution system 10‴ is different from the power distribution system 10″ in that it includes an inbuilt Ethernet for communications among the intelligent circuit breakers 01-12 as shown in FIG. 8.

FIG. 8 illustrates Ethernet bus for a power distribution system 10‴ in accordance with an example third embodiment of the disclosed concept. The intelligent circuit breakers comprise inbuilt Ethernet and communicate among one another in a peer-to-peer (P2P) network over, e.g., MODBUS® TCP (transmission control protocol), GOOSE (generic object oriented substation event) messaging. GOOSE messages are published by a device via Ethernet multicast such that the messages from an electronic device (e.g., the electrical trip unit of an intelligent circuit breaker 1) may be subscribed by any number of other electronic devices (the electronic trip units of other intelligent circuit breakers 1). The upstream circuit breaker 01 and downstream circuit breakers 02-12 communicate via an Ethernet switch, which creates the P2P network and uses multiple ports to communicate among the intelligent circuit breakers 01-12. In the P2P network, all downstream circuit breaker 02-12 transmit the real time current data and time data to the upstream circuit breaker 01 without having to wait to receive the request for the real time data from the upstream circuit breaker 01 as in the client-server communications relationship. As such, this embodiment provides further efficiency and time saving by eliminating the need for the downstream circuit breakers 02-12 to wait to receive a request from the upstream circuit breaker 01 in order to transmit a response including the real time data.

Figure 9A:
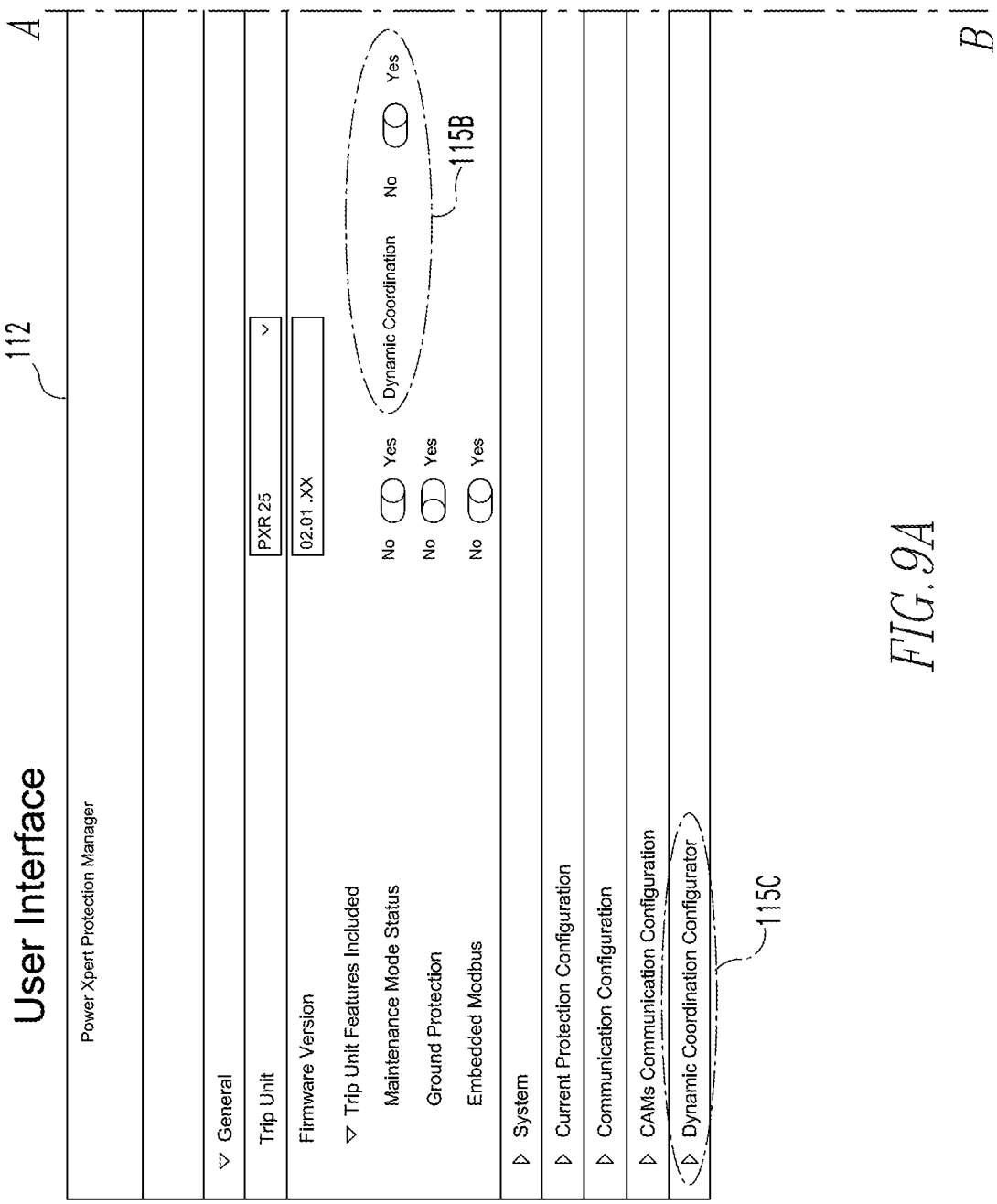

FIGS. 9A-B illustrate a user interface 112 of the energy monitoring device 110 in accordance with an example embodiment of the disclosed concept. FIG. 9 shows the user interface 112 displayed on the display 157 of a user device 24,24' as described with reference to FIG. 3. The display 157 displays various features for controlling and monitoring the intelligent circuit breaker 1, and the user or the operator uses the input apparatus 155 to control, monitor, and adjust the circuit breaker configuration settings. For example, the display 157 may display general information (e.g., without limitation, the type of the electronic trip unit 100, the version of the energy monitoring device 110, trip unit features, etc.), system information, current protection configuration, communication configuration, current graphs, and/or dynamic coordination feature. The trip unit features display, e.g., without limitation, a maintenance mode, ground protection, type of available communications adapter modules (CAM), or dynamic circuit breaker coordination features. A maintenance mode indicator shows whether an arc flash maintenance capability is provided to the intelligent circuit breaker 1 and may include, e.g., an Arc Flash Reduction Maintenance System™. A ground protection indicator indicates whether the ground fault protection is provided for the intelligent circuit breaker 1 in accordance with country or regional requirements. A CAM indicator shows communications protocols (e.g., MODBUS, INCOM, PROFIBUS, Ethernet, etc.) available for transmitting and/or receiving information between the intelligent circuit breakers 1. The dynamic coordination indicator 115B shows whether a dynamic coordination system 115 is available or enabled in the intelligent circuit breakers 1. The dynamic coordination system 115 is novel and may be added to the energy monitoring device 110, if it is not already included in the current version, by updating the firmware or software application via the utility cloud or a USB drive. The updating includes adding the dynamic coordination indicator 115B and the dynamic coordination configurator 115C. The dynamic coordination configurator 115C may be a drop down menu, road-mapping the dynamic coordination configuration of the intelligent circuit breakers 1. The dynamic coordination configurator 115C may include a first mechanism structured to perform dynamic coordination configuration of each intelligent circuit breaker based on a first user input comprising specification of a different device address for each intelligent circuit breaker, a number of levels and a number of intelligent circuit breakers in each level, establishing at least one upstream circuit breaker in each level, and selection of respective downstream circuit breakers for each upstream circuit breaker, and a second mechanism structured to, after completion of the dynamic coordination configuration, determine whether an adjustment to configuration setting of one or more intelligent circuit breakers is required based at least in part on real time data of the downstream circuit breakers, and alert a user based at least in part on a determination that the adjustment to the configuration setting is required. The dynamic coordination configurator 115C may also include a third mechanism structured to make the adjustment to the configuration setting of the one or more upstream circuit breakers remotely based on a user request. While FIG. 9 illustrates the user interface 112 displayed on the display 157 of a user device 24,24', the electronic trip unit 100 may display a similar user interface on its display 125.

Figure 10A:
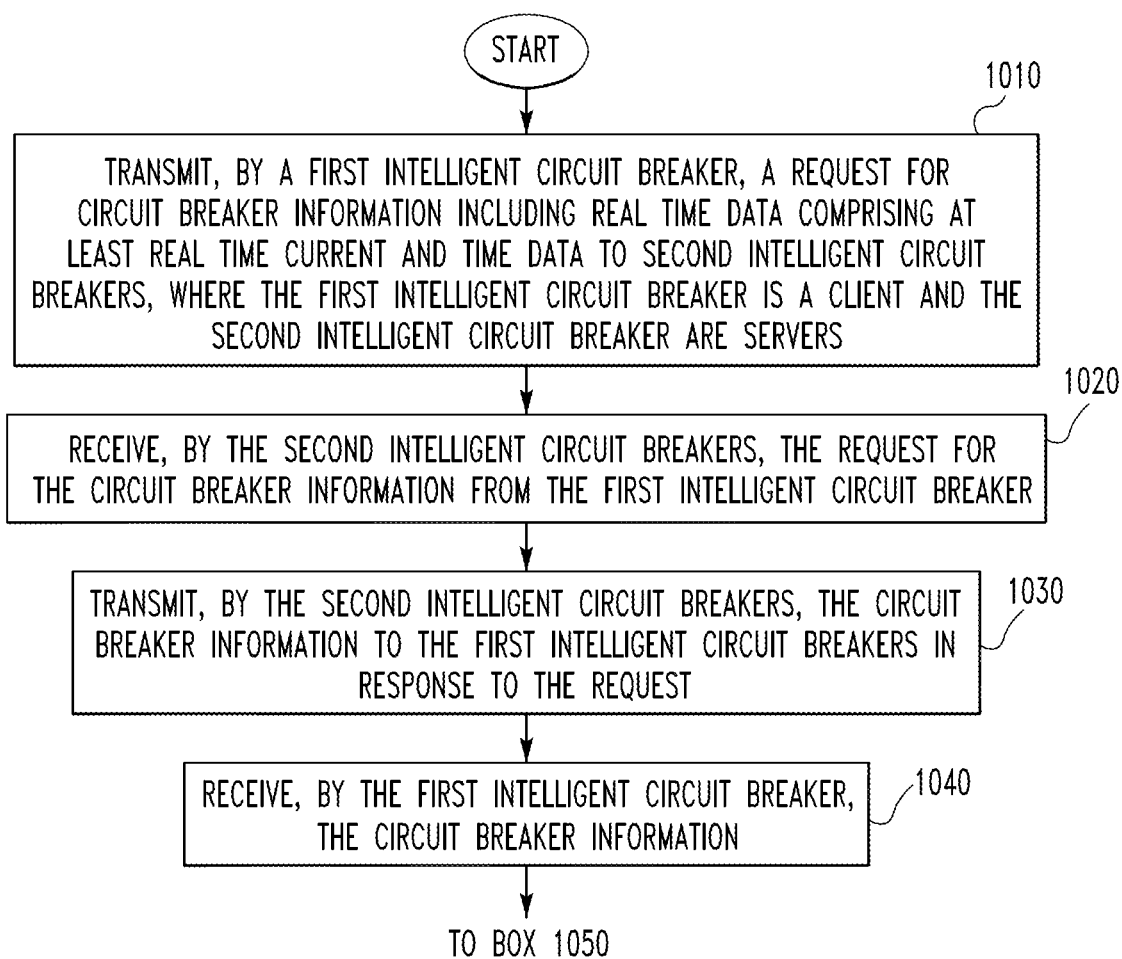
FIGS. 10A-B is a flow chart for a method of dynamic coordination in accordance with an example embodiment of the disclosed concept.
Figure 10B:
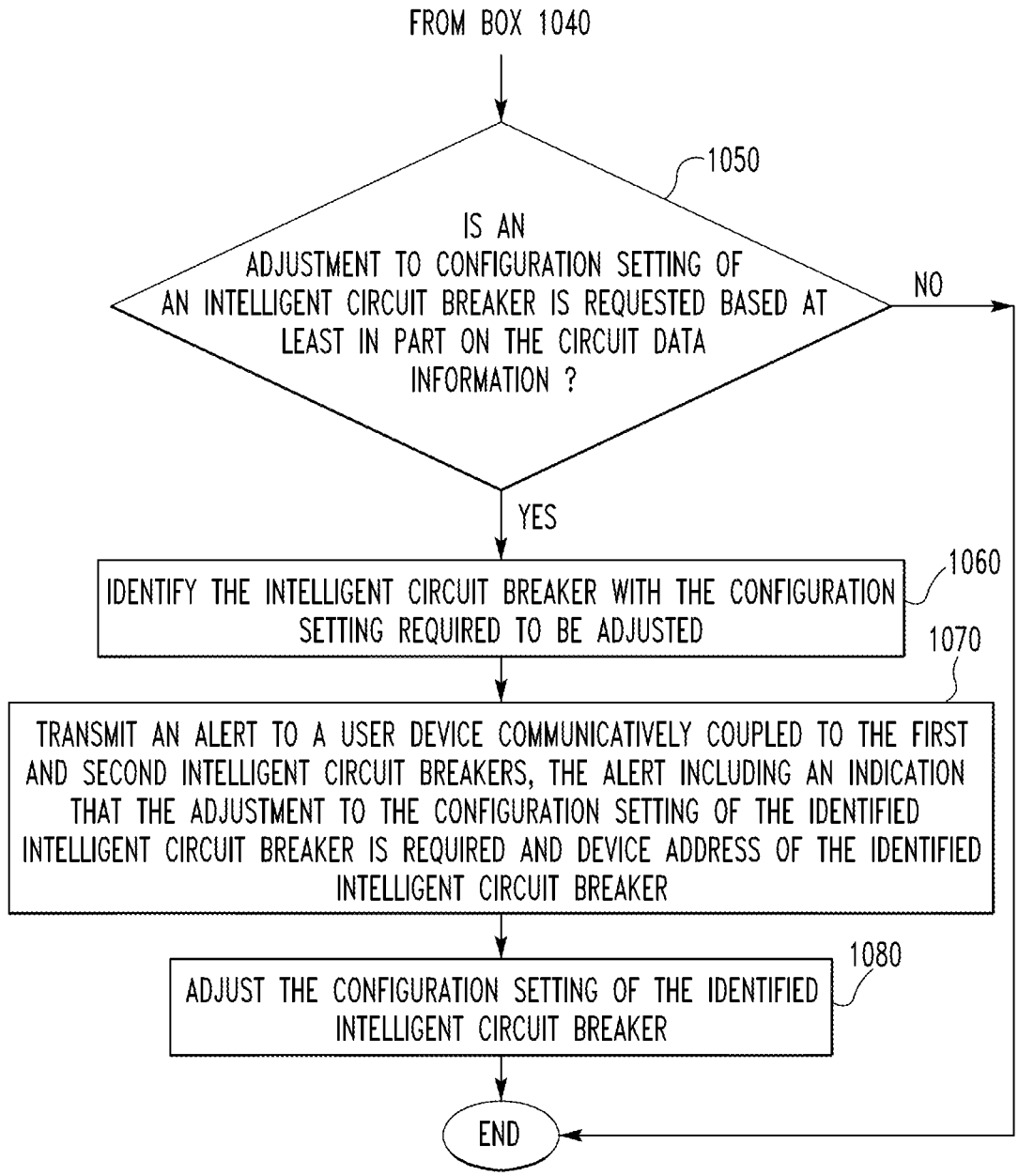

FIGS. 10A-B illustrate a flow chart for a method 1000 of dynamic coordination in accordance with an example embodiment of the disclosed concept. The method 1000 may be performed by the intelligent circuit breakers 1 as described with reference to FIG. 1 and the components thereof. The method 1000 involves a client-server network as described with reference to FIGS. 4A-6, and includes power distribution system 10',10" including a first intelligent circuit breaker and a plurality of second intelligent circuit breakers downstream to the first intelligent circuit breaker.

At 1010, the first intelligent circuit breaker transmits a request for circuit breaker information including real time data including at least real time current and time data to second intelligent circuit breakers.

At 1020, the second intelligent circuit breakers receives the request for the circuit breaker information from the first intelligent circuit breaker.

At 1030, the second intelligent circuit breakers transmit the circuit breaker information in response to the request.

At 1040, the first intelligent circuit breaker receives the circuit breaker information from the second intelligent circuit breakers.

At 1050, the dynamic coordination system determines whether an adjustment to configuration setting of an intelligent circuit breaker is required based at least in part on the circuit breaker information including the real time data. If no, the method 1000 ends. If yes, the method 1000 proceeds to 1060.

At 1060, the dynamic coordination system identifies the intelligent circuit breaker with the configuration setting required to be adjusted. The identified intelligent circuit breaker may be any circuit breaker having an incorrect configuration setting (e.g., without limitation, a current rating, time setting, etc.) within the power system.

At 1070, the dynamic coordination system transmits an alert to a user device communicatively coupled to the energy monitoring device, the alert including an indication that the adjustment to the configuration setting of the identified intelligent circuit breaker is required and device address of the identified intelligent circuit breaker. In some examples, the identified intelligent circuit breaker may have an incorrect current rating (e.g., a current rating not greater than a sum of current ratings of respective downstream circuit breakers). In that example, the dynamic coordination system transmits the alert including the identity of the upstream circuit breaker and an indication that the current rating of the identified upstream circuit breaker needs to be adjusted.

At 1080, the user adjusts the configuration setting of the identified intelligent circuit breaker. The user adjusts the configuration setting of the identified intelligent circuit breaker remotely or manually.

FIG. 11 illustrates a flow chart for a method 1100 of dynamic coordination in accordance with an example embodiment of the disclosed concept. The method 1100 may be performed by the intelligent circuit breakers 1 as described with reference to FIG. 1 and the components thereof. The method 1100 involves a peer-to-peer network as described with reference to FIGS. 7-8, and includes power distribution system 10''' including a first intelligent circuit breaker and a second intelligent circuit breakers downstream to the first intelligent circuit breaker.

At 1110, the second intelligent circuit breakers transmit circuit breaker information including real time data to the first intelligent circuit breaker.

At 1120, the first intelligent circuit breaker receives the circuit breaker information from the second intelligent circuit breakers.

At 1130, the dynamic coordination system determines whether an adjustment to configuration setting of an intelligent circuit breaker is required based at least in part on the circuit breaker information. If no, the method 1100 ends. If yes, the method 1100 proceeds to 1140.

At 1140, the dynamic coordination system identifies the intelligent circuit breaker with the configuration setting required to be adjusted.

At 1150, the dynamic coordination system transmits an alert to a user device communicatively coupled to the first and second intelligent circuit breakers, the alert including an indication that the adjustment to the configuration setting of the identified intelligent circuit breaker is required and device address of the identified intelligent circuit breaker. In some examples, the identified intelligent circuit breaker may have an incorrect current rating (e.g., a current rating not greater than a sum of current ratings of respective downstream circuit breakers). In that example, the dynamic coordination system transmits the alert including the device address of the upstream circuit breaker and an indication that the current rating of the identified upstream circuit breaker needs to be adjusted.

At 1160, the user adjusts the configuration setting of the identified intelligent circuit breaker. The user adjusts the configuration setting of the identified intelligent circuit breaker remotely or manually.

Figure 12:
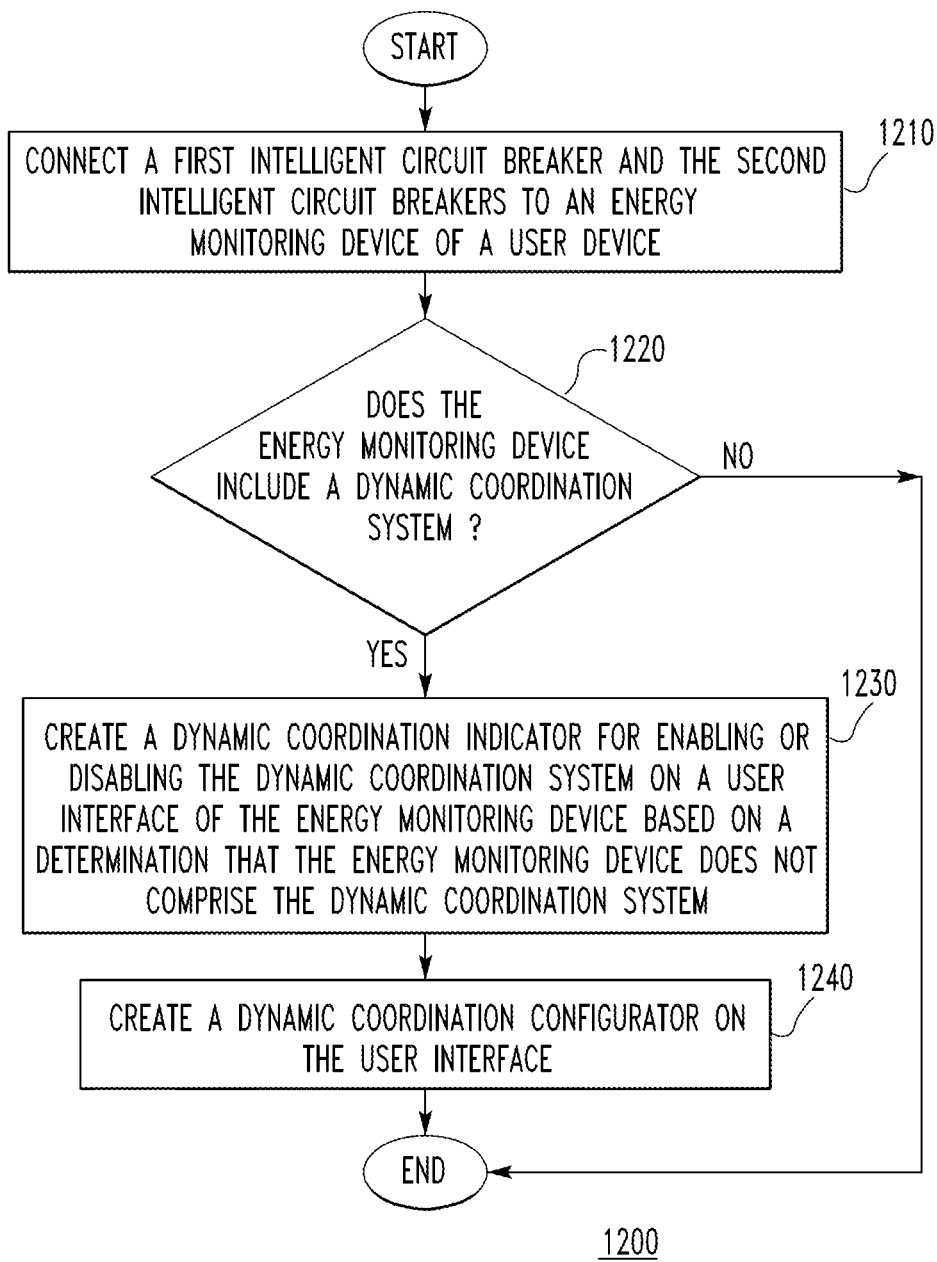
FIG. 12 is a flow chart for a method of installing a dynamic coordination system in an energy monitoring device for a first intelligent circuit breaker and a second intelligent circuit breakers downstream to the first intelligent circuit breaker in a power distribution system in accordance with an example embodiment of the disclosed concept.

FIG. 12 is a flow chart for a method 1200 of installing a dynamic coordination system in an energy monitoring device for a first intelligent circuit breaker and a second intelligent circuit breakers downstream to the first intelligent circuit breaker in a power distribution system in accordance with an example embodiment of the disclosed concept. The method 1200 may be performed by the intelligent circuit breaker 1 as described with reference to FIG. 1 and the components thereof.

At 1210, the user connects a first intelligent circuit breaker and the second intelligent circuit breakers to an energy monitoring device of a user device. The user device may be any user device (e.g., a PC, a laptop, a mobile phone, etc.) capable of communicating with the first and second intelligent circuit breakers in wired connection (e.g., via a USB cable) or wirelessly (e.g., via Bluetooth®, SMS, WiFi, LTE, LTE-A, New Radio, etc.).

At 1220, the user determines whether the energy monitoring device includes a dynamic coordination system.

At 1230, the user creates a dynamic coordination indicator for enabling or disabling the dynamic coordination system on a user interface of the energy monitoring device based on a determination that the energy monitoring device does not comprise the dynamic coordination system.

At 1240, the user creates a dynamic coordination configurator on the user interface. The dynamic coordination configurator includes a first mechanism structured to perform dynamic coordination configuration of each intelligent circuit breaker based on a first user input comprising specification of a different device address for each intelligent circuit breaker, a number of levels and a number of intelligent circuit breakers in each level, establishing the at least one upstream circuit breaker in each level, and selection of respective downstream circuit breakers for each upstream circuit breaker, and a second mechanism structured to, after completion of the dynamic coordination configuration, determine whether an adjustment to configuration setting of one or more upstream circuit breakers is required based at least in part on real time data of the second intelligent circuit breakers received from the first intelligent circuit breaker, and alert a user based at least in part on a determination that the adjustment to the configuration setting is required. The dynamic coordination configurator may also include a third mechanism structured to make the adjustment to the configuration setting of the one or more upstream circuit breakers remotely based on a user request.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof

What is claimed is:

1. A power distribution system using dynamic coordination comprising:
a first intelligent circuit breaker comprising a first electronic trip unit including a first communication module;
a plurality of second intelligent circuit breakers each comprising a second electronic trip unit including a second communication module, the first intelligent circuit breaker arranged in a first level and the second intelligent circuit breakers arranged in one or more remaining levels, each level comprising at least one upstream circuit breaker coupled to respective downstream circuit breakers, wherein the second intelligent circuit breakers are structured to transmit circuit breaker information to the first intelligent circuit breaker and the first intelligent circuit is structured to receive the circuit breaker information,
wherein the first electronic trip unit and the second electronic trip unit comprise an energy monitoring device structured to monitor and control the operation of the first intelligent circuit breaker and the second intelligent circuit breakers, the energy monitoring device comprising a dynamic coordination system structured to automatically:
(i) determine whether an adjustment to configuration setting of an intelligent circuit breaker is required based at least in part on the circuit breaker information;
(ii) identify the intelligent circuit breaker with the configuration setting required to be adjusted based on a determination that the adjustment is required; and
(iii) transmit an alert to user, the alert comprising an indication that the adjustment to the configuration setting of the identified intelligent circuit breaker is required and device address of the identified intelligent circuit breaker, and
wherein the first and second intelligent circuit breakers are communicatively couplable to a user device which also includes the energy monitoring device comprising the dynamic coordination system.

2. The power distribution system of claim 1, wherein the dynamic coordination system is further structured to:
adjust remotely the configuration setting of the identified circuit breaker based at least in part on a user input, wherein the first and second intelligent circuit breakers are coupled to the user device.

3. The power distribution system of claim 1, wherein the dynamic coordination system is further structured to:
adjust manually the configuration setting of the identified circuit breaker based at least in part on the alert.

4. The power distribution system of claim 1, wherein the circuit breaker information comprises the real time data and function codes for reading the real time data, the real time data comprise at least real time current data and real time time data, the real time current data comprise at least nominal current rating ($I_N$) and continuous current rating ($I_R$), and the real time time data comprise at least pickup time and delays.

5. The power distribution system of claim 1, wherein the identified intelligent circuit breaker is an upstream circuit breaker, and the determining whether an adjustment to configuration setting of an intelligent circuit breaker is required comprises:
    comparing current rating of each upstream circuit breaker to a sum of current ratings of the respective downstream circuit breakers;
    determining whether the current rating of each upstream circuit breaker is greater than the sum of the current ratings of the respective downstream circuit breakers; and
    determining that an adjustment to trip unit setting of the upstream circuit breaker is required based on a determination that the current rating of the upstream circuit breaker is not greater than the sum of the current ratings of the respective downstream circuit breakers.

6. The power distribution system of claim 1, wherein the determining whether an adjustment to configuration setting of an intelligent circuit breaker is required comprises:
    comparing present trip unit setting associated with at least one of current rating or time setting of each intelligent circuit breaker to respective required trip unit setting associated with the at least one of current rating or time setting;
    determining whether an adjustment to trip unit setting of any intelligent circuit breaker is required based on a comparison result that the present trip unit setting does not satisfy the respective required trip unit setting; and
    determining that the adjustment to the trip unit setting of one or more intelligent circuit breakers is required based on a determination that the present trip unit setting of the one or more intelligent circuit breakers does not satisfy the respective required trip unit setting.

7. The power distribution system of claim 1, wherein the configuration for dynamic coordination comprises specifying a different device address for each intelligent circuit breaker, determining a number of levels and a number of intelligent circuit breakers in each level, establishing the at least one upstream circuit breaker in each level, and selecting respective downstream circuit breakers for each upstream circuit breaker based on a user input.

8. The power distribution system of claim 1, wherein the first and second intelligent circuit breakers communicate with one another automatically.

9. The power distribution system of claim 1, wherein the first and second communication modules comprise Ethernet, and the first intelligent circuit breaker and the second intelligent circuit breakers communicate in a peer to peer relationship, and wherein the second intelligent circuit breakers transmit the circuit breaker information to the first intelligent circuit breaker without having to wait to receive a request for the circuit breaker information from the first intelligent circuit breaker.

10. The power distribution system of claim 1, wherein the first intelligent circuit breaker is further structured to transmit a request to the second intelligent circuit breakers for circuit breaker information comprising real time data, the second intelligent circuit breakers are further structured to receive the request, and the second intelligent circuit breakers transmit the circuit breaker information to the first intelligent circuit breaker in response to the request received from the first intelligent circuit breaker.

11. The power distribution system of claim 10, wherein the first and second communication modules comprise a communication module allowing the first and second intelligent circuit breakers to communicate over serial data lines, the first intelligent circuit breaker being a sole client and the second intelligent circuit breakers being servers in a client-server network, and the power distribution system comprises two levels, the second level being a single-downstream level including all the second intelligent circuit breakers.

12. The power distribution system of claim 10, wherein the first and second communication modules comprise a communication module allowing the first and second intelligent circuit breakers to communicate over serial data lines, the first intelligent circuit breaker being a sole client and the second intelligent circuit breakers being servers in a client-server network, the power distribution system comprises more than two levels.

13. A method of dynamic coordination with a first intelligent circuit breaker in a first level and second intelligent circuit breakers downstream to the first intelligent circuit breaker in one or more remaining levels in a power distribution system, each level including at least one upstream circuit breaker, each upstream circuit breaker coupled to respective downstream circuit breakers, each intelligent circuit breaker including an energy monitoring device with a dynamic coordination system, the method comprising:
    transmitting, by the second intelligent circuit breakers, circuit breaker information comprising real time data to the first intelligent circuit breaker;
    receiving, by the first intelligent circuit breaker, the circuit breaker information;
    determining, by the dynamic coordination system, whether an adjustment to configuration setting of an intelligent circuit breaker is required based at least in part on the circuit breaker information;
    identifying the intelligent circuit breaker with the configuration setting required to be adjusted based on a determination that the adjustment is required;
    transmitting an alert to a user device communicatively coupled to the first and second intelligent circuit breakers, the alert comprising an indication that the adjustment to the configuration setting of the identified intelligent circuit breaker is required and device address of the identified upstream circuit breaker; and
    adjusting the configuration setting of the identified intelligent circuit breaker.

14. The method of claim 13, wherein adjusting the configuration setting of the identified intelligent circuit breaker comprises:
    adjusting remotely the configuration setting of the identified intelligent circuit breaker based on a user input, wherein the first and second intelligent circuit breakers are connected to a user device also including the energy monitoring device comprising the dynamic coordination system.

15. The method of claim 13, wherein adjusting the configuration setting of the identified intelligent circuit breaker comprises:
    adjusting manually the configuration setting of the identified intelligent circuit breaker by the user.

16. The method of claim 13, wherein the identified intelligent circuit breaker is an upstream circuit breaker, and the determining whether an adjustment to configuration setting of one or more intelligent circuit breaker is required comprises:

comparing current rating of each upstream circuit breaker and a sum of current ratings of the respective downstream circuit breakers;

determining whether the current rating of each upstream circuit breaker is greater than the sum of the current ratings of the respective downstream circuit breakers; and determining that trip unit setting of the identified upstream circuit breaker is to be adjusted based on a determination that the current rating of the upstream circuit breaker is not greater than the sum of the current ratings of the respective downstream circuit breakers.

17. The method of claim 13, wherein each intelligent circuit breaker comprises a communication module establishing a peer-to-peer network among the first and second intelligent circuit breakers, and each second circuit breaker transmits the real time data to the first intelligent circuit breaker without having to respond only upon receiving a request for the real time data from the first intelligent circuit.

18. The method of claim 13, wherein each intelligent circuit breaker comprises a communication module establishing a client-server network, the first intelligent circuit breaker being a sole client and the second intelligent circuit breakers being servers, and the transmitting, by the second intelligent circuit breakers, to the first intelligent circuit breaker comprises:

transmitting, by the first intelligent circuit breaker, a request for the real time data to the second intelligent circuit breakers;

receiving, by the second intelligent circuit breakers, the request for real time data from the first circuit intelligent circuit breaker; and transmitting, by the second intelligent circuit breakers, the real time data to the first intelligent in response to the request, wherein the first intelligent circuit breaker and the second intelligent circuit breakers communicate in a client-server network.

19. A method for installing a dynamic coordination system in an energy monitoring device of a user device couplable to a first intelligent circuit breaker and a plurality of second intelligent circuit breakers downstream to the first intelligent circuit breaker in a power distribution system, comprising:

connecting the first and second intelligent circuit breakers to the energy monitoring device;

determining whether the energy monitoring device comprises the dynamic coordination system;

creating a dynamic coordination indicator for enabling or disabling the dynamic coordination system on a user interface of the energy monitoring device based on a determination that the energy monitoring device does not comprise the dynamic coordination system; and creating a dynamic coordination configurator on the user interface.

20. The method of claim 19, wherein the dynamic coordination configurator comprises:

a first mechanism structured to perform dynamic coordination configuration of each intelligent circuit breaker based on a first user input comprising specification of a different device address for each intelligent circuit breaker, a number of levels and a number of intelligent circuit breakers in each level, establishing the at least one upstream circuit breaker in each level, and selection of respective downstream circuit breakers for each upstream circuit breaker; and a second mechanism structured to, after completion of the dynamic coordination configuration, determine whether an adjustment to configuration setting of one or more upstream circuit breakers is required based at least in part on real time data of the second intelligent circuit breakers received from the first intelligent circuit breaker, and alert a user based at least in part on a determination that the adjustment to the configuration setting is required.

* * * * *